United States Patent
Kasslin et al.

(10) Patent No.: US 8,355,389 B2
(45) Date of Patent: Jan. 15, 2013

(54) SIMULTANEOUS TRANSMISSIONS DURING A TRANSMISSION OPPORTUNITY

(75) Inventors: Mika Kasslin, Espoo (FI); Jarkko Kneckt, Espoo (FI)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 12/722,715

(22) Filed: Mar. 12, 2010

(65) Prior Publication Data

US 2011/0222408 A1   Sep. 15, 2011

(51) Int. Cl.
*H04W 4/00* (2009.01)
*H04L 12/413* (2006.01)

(52) U.S. Cl. ........................................ 370/338; 370/445

(58) Field of Classification Search .................. 370/338, 370/445, 447, 461
See application file for complete search history.

(56) References Cited

U.S. PATENT DOCUMENTS

| | | | |
|---|---|---|---|
| 7,519,013 B2 | 4/2009 | Destino et al. | |
| 2002/0136184 A1* | 9/2002 | Liang et al. | 370/338 |
| 2005/0041616 A1* | 2/2005 | Ginzburg et al. | 370/328 |
| 2005/0058151 A1* | 3/2005 | Yeh | 370/445 |
| 2005/0136933 A1* | 6/2005 | Sandhu et al. | 455/450 |
| 2005/0276276 A1* | 12/2005 | Davis | 370/447 |
| 2006/0109804 A1 | 5/2006 | Wang et al. | |
| 2010/0208618 A1* | 8/2010 | Kim et al. | 370/254 |
| 2010/0226271 A1* | 9/2010 | Kwon et al. | 370/252 |

FOREIGN PATENT DOCUMENTS

| | | |
|---|---|---|
| WO | 2005/053235 A1 | 6/2005 |
| WO | 2008027849 A1 | 3/2008 |

OTHER PUBLICATIONS

Alawieh, B. et al., "Improving Spatial Reuse in Multihop Wireless Networks—a Survey", IEEE Communications Surveys & Tutorials, vol. 11, No. 3, pp. 71-91, Third Quarter 2009.
International Search Report and Written Opinion issued May 12, 2011 for PCT/FI2011/050107, 14 pp.

* cited by examiner

*Primary Examiner* — Andrew Lee
(74) *Attorney, Agent, or Firm* — Locke Lord LLP

(57) ABSTRACT

Method, apparatus, and computer program product embodiments are disclosed to enhance capacity of a wireless communication network through spatial reuse of the shared communication medium, using an autonomous parallel operation without central coordination and header frames. Example embodiments of the invention include a signaling method that defines and sets up a Simultaneous Transmissions mode between two pairs of devices to reuse a transmission opportunity (TXOP). In example embodiments of the invention, an arrangement may be made between device pairs (each pair comprising a transmitter device and a receiver device) to allow selected pairs to communicate at a same time. The example signaling method defines example signaling for setting up simultaneous transmitter/receiver pairs in a network and operating the transmitter/receiver pairs in simultaneous transmission. If a device in a setup pair detects some other transmission than that is not allowed by one of its device pair arrangements, the device ceases its transmission.

25 Claims, 33 Drawing Sheets

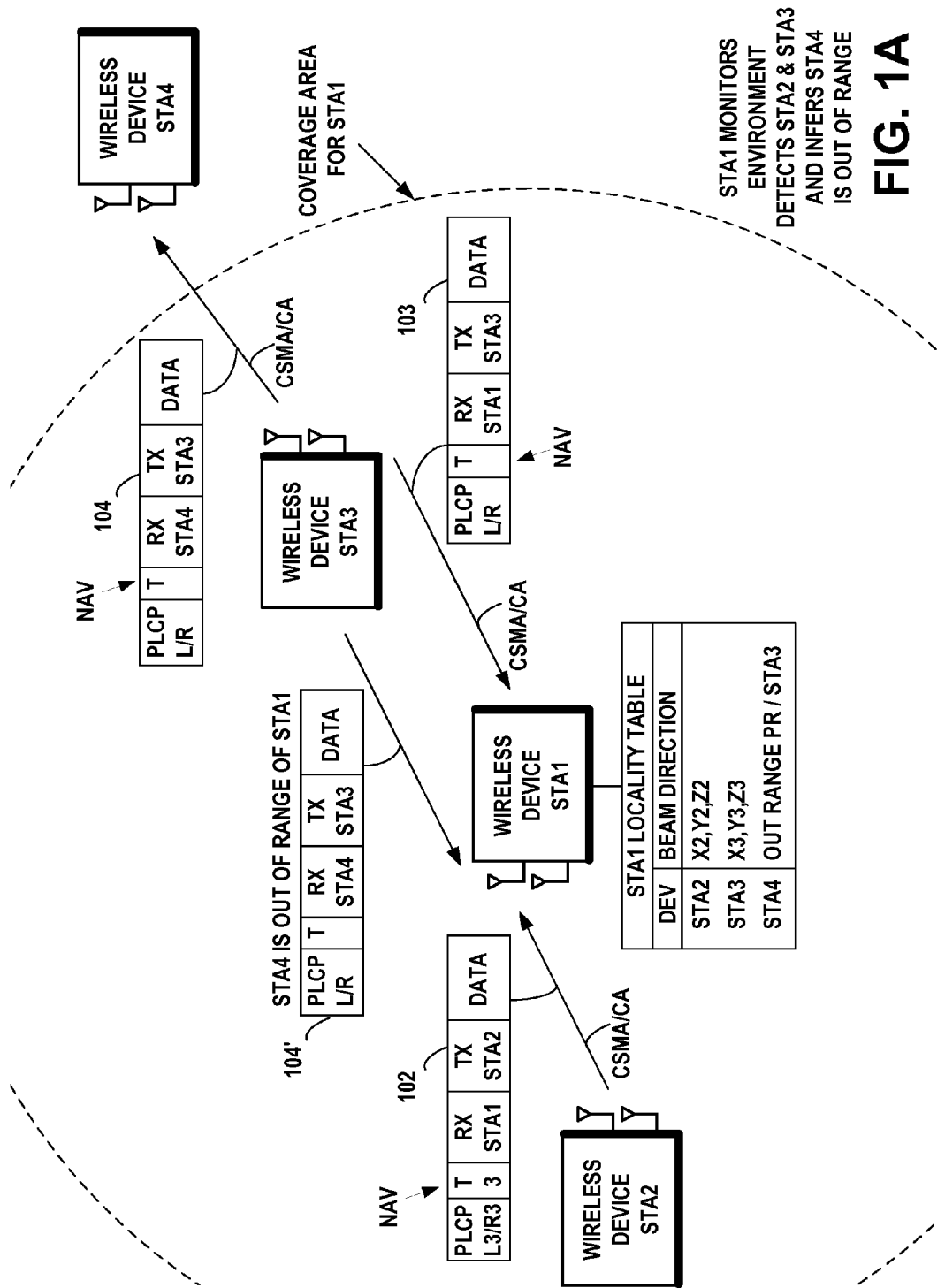

FIG. 1D

STA1 REQUESTS SIMULTANEOUS TRANSMISSIONS FROM STA3

STA1 AND STA2 HAVE FORMED PAIR(STA1,STA2)

STA3 AND STA4 HAVE FORMED PAIR(STA3,STA4)

| PLCP L/R | T | RX STA3 | TX STA1 | SIMULTANEOUS TRANSMISSIONS REQUEST | | | | |
|---|---|---|---|---|---|---|---|---|
| | | | | TUPLET 1 TX = STA2 | TUPLET 1 RX = STA2 | TUPLET 2 TX = STA3 | TUPLET 2 RX = STA4 | DIALOG TOKEN | LIFETIME |

107

LIFETIME FIELD SPECIFIES PROPOSED DURATION FOR THE SIMULTANEOUS TRANSMISSION MODE OF PAIR(STA1,STA2) AND PAIR(STA3,STA4)

STA1 REQUESTS SIMULTANEOUS TRANSMISSIONS FROM STA3

FIG. 1Db

PROCESS IN STA1 FOR TRANSMITTING SIMULTANEOUS
TRANSMISSIONS REQUEST TO STA3 170

STEP 172: DETECT TRANSMITTER STA3 USING A LOT OF TRANSMISSION RESOURCES IN THE SAME OPERATING CHANNEL.

STEP 174: DECIDE TO SET UP SIMULTANEOUS TRANSMISSION MODE BETWEEN PAIR(STA1,STA2) AND PAIR(STA3,STA4)

STEP 176: TRANSMIT SIMULTANEOUS TRANSMISSIONS REQUEST PACKET SPECIFYING PAIR(STA1,STA2), PAIR(STA3,STA4), AND THE PROPOSED DURATION (LIFETIME) FOR THE SIMULTANEOUS TRANSMISSION MODE OF PAIR(STA1,STA2) AND PAIR(STA3,STA4)

FIG. 1Eb

PROCESS IN TRANSMITTING DEVICE STA1 FOR
TRANSMITTING A TEST MESSAGE TO STA2 IN PAIR(STA1,STA2)

STEP 180: DETECT A MESSAGE TRANSMISSION FROM STA 3 TO STA 4 IN PAIR(STA3,STA4).

STEP 181: TRANSMIT A TEST PACKET TO STA2 IN PAIR(STA1,STA2). (AS AN OPTION STA1 NEED NOT SEND AN RTS, BUT MAY IMMEDIATELY TRANSMIT WITHOUT AN RTS, AND RELY ON ITS PHYSICAL AND VIRTUAL CARRIER SENSING.) NOTE THAT MULTIPLE TEST PACKETS MAY BE TRANSMITTED DURING MULTIPLE SIMULTANEOUS FRAME TRANSMISSIONS.

STEP 182: OBTAIN TXOP TO REQUEST ACKNOWLEDGEMENT OR BLOCK ACKNOWLEDGEMENT FROM STA2 TO INDICATE DELIVERY STATUS OF THE TEST PACKET. IN SOME FRAME FLOWS, THE STA1 MAY ALSO OBTAIN TXOP TO TRANSMIT THE ACKNOWLEDGEMENT.

STEP 183: VERIFY THAT SIMULTANEOUS TRANSMISSIONS ARE POSSIBLE TO PERFORM

FIG. 1Ec

PROCESS IN RECEIVING DEVICE STA2 FOR RESPONDING TO TEST
MESSAGE FROM STA1 IN PAIR(STA1,STA2) 185

STEP 186: SET THE RECEIVER ON TO RECEIVE TEST PACKET FROM TRANSMITTING STA1

STEP 187: IF TEST PACKET IS SUCCESSFULLY RECEIVED, THEN SET THE STATUS CODE TO "SUCCESS".

STEP 188: DEFER RESPONDING WITH ACK DURING THE PENDENCY OF THE TXOP FOR STA3'S PACKET, AND RESPOND ONLY AFTER THE STA1 REQUESTS WITH BAR OR IF THE STA2 OBTAINS NEW TXOP FOR RESPONSE TRANSMISSION.

STEP 189: TRANSMIT ACK OR RESPONSE FRAME WITH STATUS CODE TO STA1

FIG. 1Fb

PROCESS IN STA3 FOR TRANSMITTING SIMULTANEOUS TRANSMISSIONS RESPONSE TO STA1 190

STEP 192: VERIFY THAT SIMULTANEOUS TRANSMISSIONS ARE POSSIBLE TO PERFORM

STEP 194: IF SIMULTANEOUS TRANSMISSIONS FEATURE IS SUPPORTED, IF THERE WOULD BE NO RESULTING COLLISIONS, IF STA3 VOLUNTEERS TO PARTICIPATE IN THE SIMULTANEOUS TRANSMISSIONS MODE, AND IF SUCH A MODE HAS NOT ALREADY BEEN SET UP IN STA3 WITH NO CAPACITY FOR AN ADDITIONAL MODE, THEN SET THE STATUS CODE TO "SUCCESS".

STEP 196: TRANSMIT SIMULTANEOUS TRANSMISSIONS RESPONSE PACKET WITH STATUS CODE TO STA1

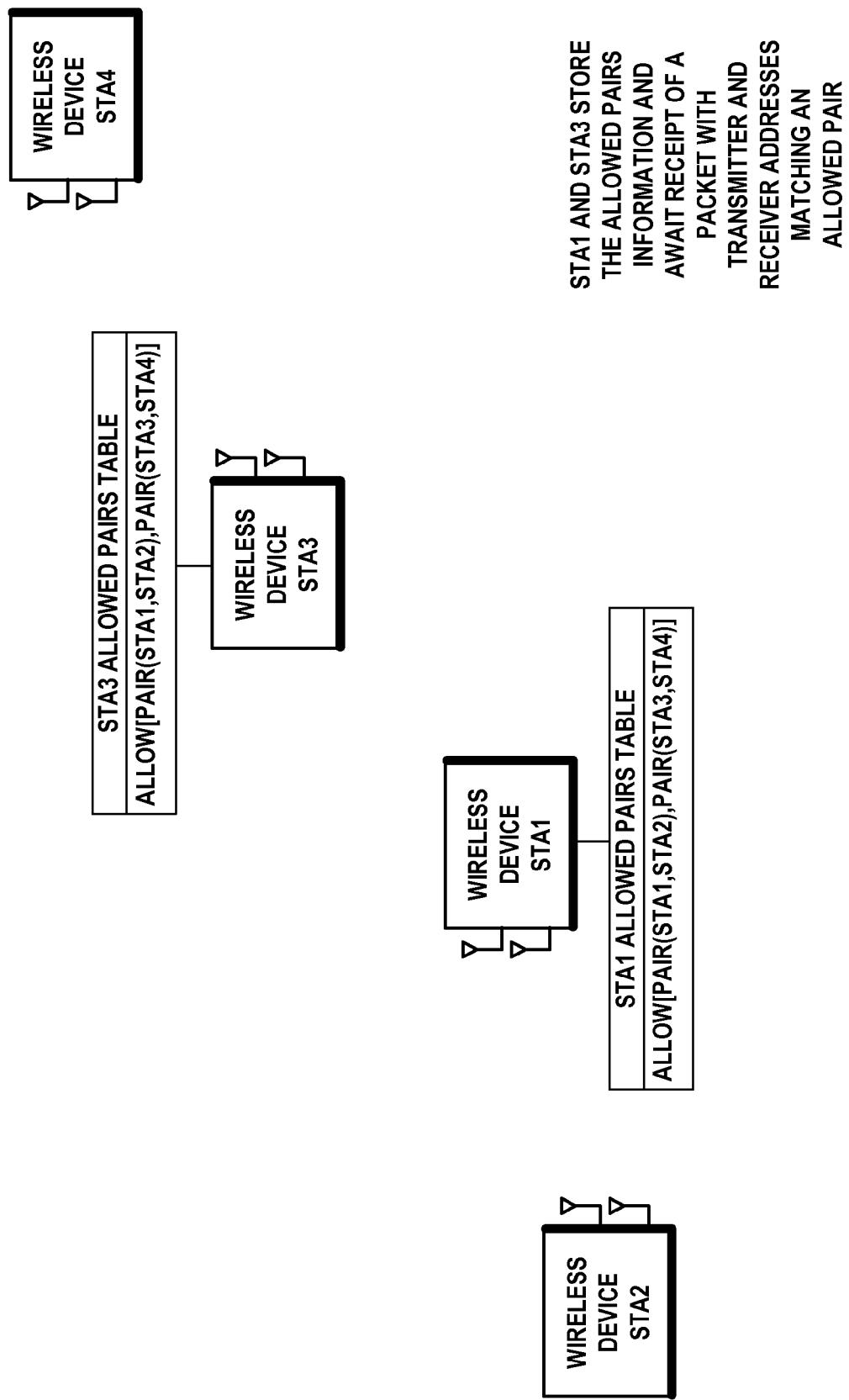

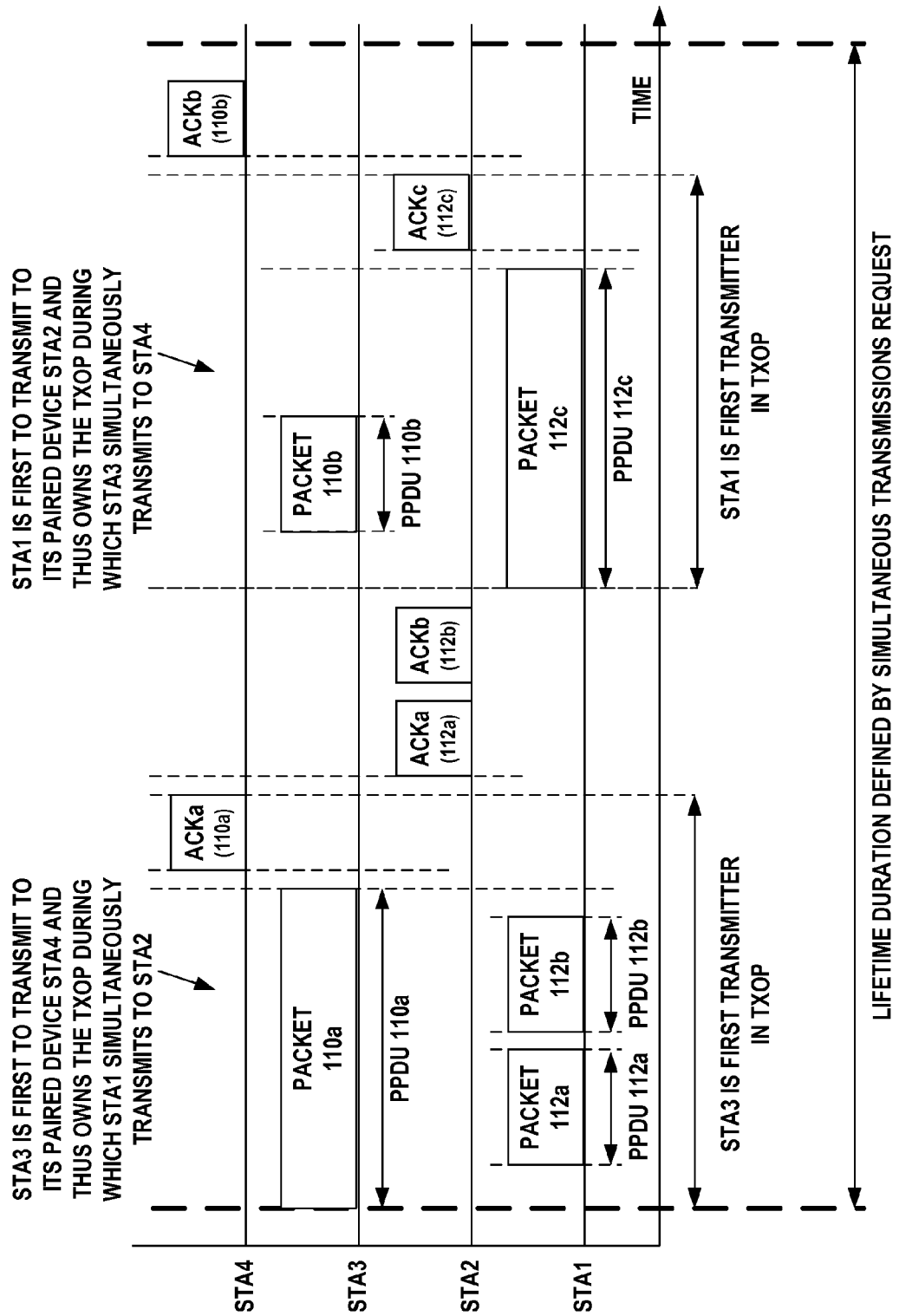
FIG. 1Jb  MULTIPLE TXOPs MAY OCCUR DURING THE LIFETIME DURATION

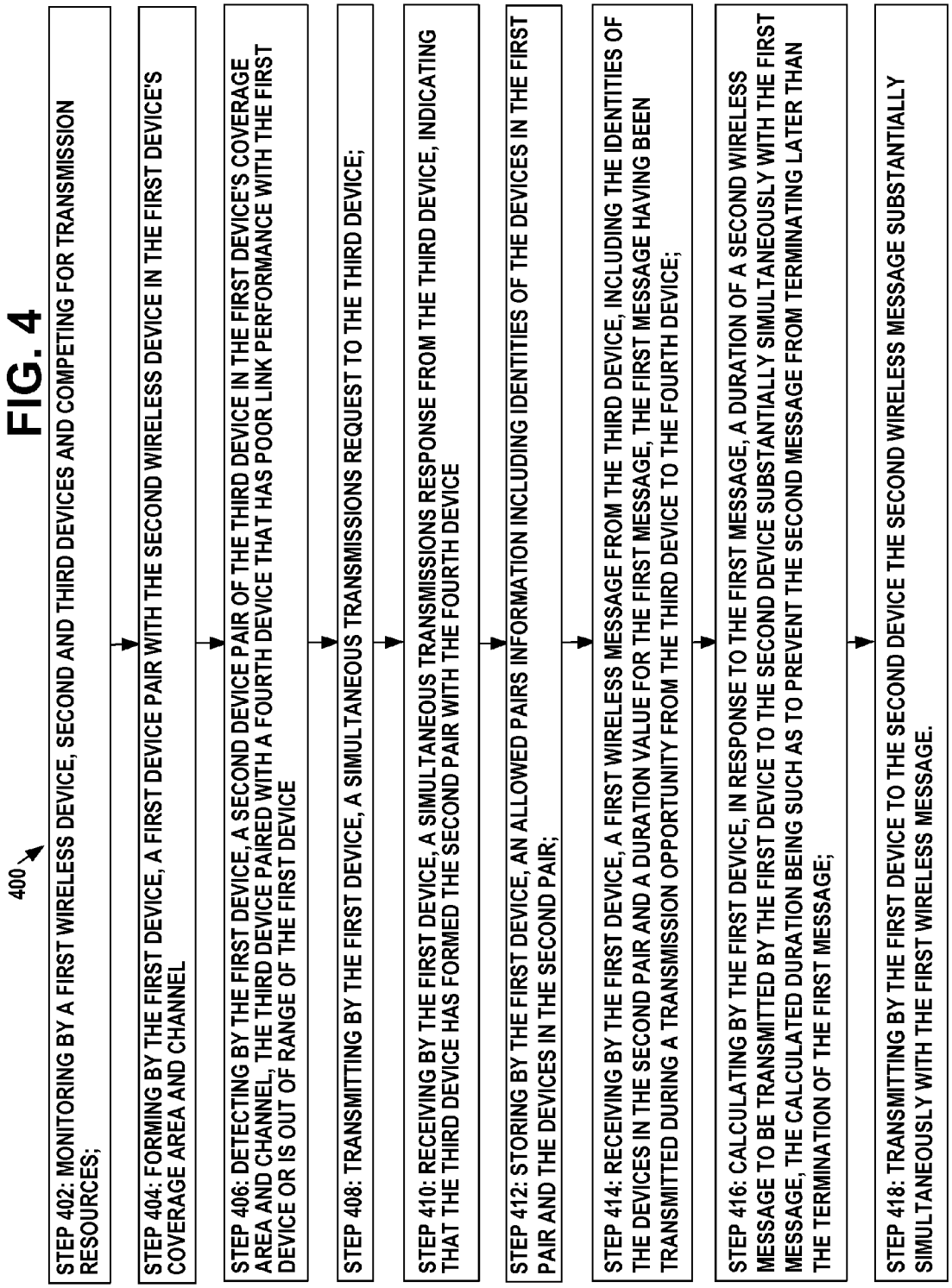

STEPS 402 TO 418 OF THE FLOW DIAGRAM OF FIGURE 4, WHEREIN THE FIRST DEVICE IS TRANSMITTING TO THE SECOND DEVICE SIMULTANEOUSLY WITH THE THIRD DEVICE TRANSMITTING TO THE FOURTH DEVICE.

↓

STEP 452: TRANSMITTING BY THE FIRST DEVICE, A FIRST SIMULTANEOUS TRANSMISSIONS INDICATION TO THE THIRD DEVICE, INDICATING SUCCESSFUL AND FAILED TRANSMISSIONS FROM THE FIRST DEVICE TO THE SECOND DEVICE

↓

STEP 456: RECEIVING BY THE FIRST DEVICE, A SECOND SIMULTANEOUS TRANSMISSIONS INDICATION FROM THE THIRD DEVICE, INDICATING SUCCESSFUL AND FAILED TRANSMISSIONS FROM THE THIRD DEVICE TO THE FOURTH DEVICE

↓

STEP 458: DETERMINING BY THE FIRST DEVICE FROM THE FIRST AND SECOND SIMULTANEOUS TRANSMISSIONS INDICATIONS, WHETHER TO CONTINUE THE SIMULTANEOUS TRANSMISSIONS

STEP 482: PARTICIPATING BY A FIRST DEVICE IN ESTABLISHMENT OF A FIRST DEVICE PAIR WITH A SECOND DEVICE;

↓

STEP 484: PARTICIPATING BY THE FIRST DEVICE IN ESTABLISHMENT OF A SIMULTANEOUS TRANSMISSIONS MODE BETWEEN THE FIRST DEVICE PAIR, AND A SECOND DEVICE PAIR INCLUDING A THIRD AND FOURTH WIRELESS DEVICES;

↓

STEP 486: WIRELESSLY RECEIVING BY THE FIRST DEVICE AT LEAST A PORTION OF A FIRST PACKET FROM THE THIRD DEVICE THAT WAS TRANSMITTED BY THE THIRD DEVICE AND DESTINED FOR THE FOURTH DEVICE, THE AT LEAST PORTION OF THE FIRST PACKET CONTAINING A LENGTH VALUE AND A WIRELESS TRANSMISSION RATE VALUE FOR THE FIRST PACKET;

↓

STEP 488: CALCULATING BY THE FIRST WIRELESS DEVICE, A FIRST DURATION FOR THE FIRST PACKET BASED ON THE LENGTH AND TRANSMISSION RATE VALUES;

↓

STEP 490: GENERATING BY THE FIRST WIRELESS DEVICE, A SECOND PACKET TO BE SUBSTANTIALLY SIMULTANEOUSLY TRANSMITTED BY THE FIRST WIRELESS DEVICE AND DESTINED FOR THE SECOND WIRELESS DEVICE, WITH A SECOND DURATION THAT FITS WITHIN THE FIRST DURATION OF THE FIRST PACKET;

↓

STEP 492: WIRELESSLY TRANSMITTING BY THE FIRST WIRELESS DEVICE, THE SECOND PACKET DESTINED FOR THE SECOND DEVICE, SUBSTANTIALLY SIMULTANEOUSLY WITH TRANSMISSION OF THE FIRST PACKET FROM THE THIRD DEVICE DESTINED FOR THE FOURTH DEVICE.

SIMULTANEOUS TRANSMISSIONS DURING A TRANSMISSION OPPORTUNITY

FIELD

The field of the invention relates to wireless communication and more particularly to enhancing capacity of a wireless communication network through spatial reuse of the shared communication medium.

BACKGROUND

IEEE 802.11b and 802.11g wireless local area networks (WLANs) have been a staple technology for traditional WiFi applications in the 2.4 GHz ISM band. However, the increase in emerging broadband applications has stimulated interest in developing very high-speed wireless networks for short range communication. Wireless, high-definition multimedia interface (HDMI), high-speed trunk links, and multimedia content distribution services are examples of such broadband applications. For example, the IEEE 802.11n WLAN provides a higher throughput with improvements using multiple input, multiple output (MIMO) antennas. Another example is the planned IEEE 802.11ac WLAN that is to provide a very high throughput at less than 6 GHz, using an improved modulation scheme; wider channels and having multi user MIMO. Still another example is the planned IEEE 802.11ad WLAN that is to provide a very high throughput at 60 GHz. The 60 GHz millimeter (mmWave) band may be suitable for such high speed and/or high capacity wireless networks because of the worldwide availability of unlicensed spectrum in this band. However, compared to lower frequency band systems, the coverage range in the mmWave band is limited by higher loss in free space propagation, lower penetration, reflection and scattering losses, and absorption by ambient molecular oxygen.

SUMMARY

Method, apparatus, and computer program product embodiments are disclosed to enhance capacity of a wireless communication network through spatial reuse of the shared communication medium, using an autonomous parallel operation without central coordination and header frames. Example embodiments of the invention include a signaling method for implementing carrier sense multiple access with collision avoidance (CSMA/CA) based reuse of a transmission opportunity (TXOP) for channel access in a wireless local area network (WLAN). The example wireless devices or stations in a network operate in the same coverage area and channel, and may compete for the same transmission resources. The example signaling method enables the simultaneous transmission of multiple wireless signals from stations in a network, which do not interfere with one another because of their limited coverage range. Example embodiments of the invention operate in all network topologies, including an IEEE 802.11 Basic Service Set (BSS), a Peer-to-peer BSS, a Mesh BSS (MBSS), an Independent BSS (IBSS) and a Tunneled Direct Link BSS (IEEE 802.11z). Example embodiments of the invention enhance the CSMA/CA access method operating in all frequency bands, for example from country specific white spaces between 50 and 700 MHz, the 2.4 GHz ISM band, the 5.0 GHz band for the IEEE 802.11ac standard, up beyond the 60 GHz band for the IEEE 802.11ad standard.

Example embodiments of the invention include a signaling method that defines and sets up a Simultaneous Transmissions mode between two pairs of devices to reuse a transmission opportunity (TXOP). In example embodiments of the invention, a cooperative arrangement may be made between device pairs (each pair comprising a transmitter device and a receiver device) to allow selected pairs to communicate at a same time. Each device may have multiple device pair arrangements. The example signaling method defines example signaling for setting up simultaneous transmitter/receiver pairs in a network and operating the transmitter/receiver pairs in simultaneous transmission. If a device in a setup pair detects some other transmission that is not allowed by one of its device pair arrangements, the device ceases its transmission.

In an example scenario, wireless devices normally use the CSMA/CA access method of the IEEE 802.11 WLAN standard to gain access to the wireless medium. A first device detects that it is frequently delayed in beginning transmissions to a second device, because a third device is a frequent user of the medium. The first device determines from the addresses in the packets it overhears from the third device that the third device is transmitting its packets to a fourth device whose reply transmissions are not received by the first device. The first device sends a query to the second device asking whether the second device receives the packets transmitted by the third device. If the second device replies that it does not receive packets transmitted by the third device or that the link performance is poor with the third device, then the first device recognizes that a cooperative arrangement may be possible with the third device, called a simultaneous transmissions mode. In order to set up a simultaneous transmissions mode, the first device may establish a device pair arrangement with the second device by determining whether the second device has the capability to participate as a receiver device in a simultaneous transmissions mode arrangement. In a device pair, when the second device receives any transmissions from the first device, it delays sending any reply until after the expiration of the current transmit opportunity (TXOP) in which the first device has transmitted. If the second device has the capability, then the first device and second device establish a device pair.

Then, in the example scenario, the first device sends a proposal to the third device to set up a simultaneous transmissions mode, specifying that the arrangement would be between a first device pair consisting of the first as the transmitter and second device as the receiver and a second device pair consisting of the third device as the transmitter and the fourth device as the receiver. The third device makes a similar determination of the capabilities of the fourth device and whether the fourth device does not receive transmissions from the first device. If the third device responds and agrees with the proposed arrangement, then a simultaneous transmissions mode is established between the two pairs of devices.

The objective in the simultaneous transmissions mode is according to an embodiment is to enable the first and third devices to simultaneously transmit packets to their respective second and fourth receiving devices in the first and second device pairs, even though the first and third devices are within each other's coverage areas. In the example scenario, this is accomplished by juxtaposing the physical packets so that the second transmitted packet does not terminate later that the first transmitted packet. For example, when the third device begins by transmitting a first packet to the fourth device, the first device will also receive the first packet and will recognize from its addresses that it satisfies the condition for simultaneous transmission. The first packet will have the standard IEEE 802.11 frame format, which is a PLCP protocol data unit (PPDU). The PPDU represents the physical packet as it is transmitted in the RF medium. The PPDU consists of a physical layer conversion procedure (PCLP) preamble, a PLCP header, and a MAC protocol data unit (MPDU). The PLCP header includes the length L of the MPDU and its data rate R. From these values, the first device calculates the duration of the PPDU of both the first packet and the second packet. According to an embodiment of the present invention the duration of the PPDU of the second physical packet to be simultaneously transmitted by the first device to the second device, fits within the duration of the PPDU of the first physical packet sent from the third device to the fourth device.

In the example scenario, the second device is obliged by its paired arrangement with the first device, to delay transmitting any packet until after the expiration of the current transmit opportunity (TXOP) in which the first device has transmitted the second message. The NAV value T is defined in the packets transmitted by the third device. The value of T is decremented as time passes, so that the value of T that the first device inserts into the MPDU of the second packet and transmits to the second device, is the remaining duration before the expiration of the NAV. Thus, the protection area to avoid interference and transmission collisions is increased and second device knows by how much it delays any replies to the first device after receiving the second packet. In another embodiment, the value T that the first device inserts into MPDU of the second packet and transmits to the second device, is set to zero (0). Thus, the coverage of the NAV protection is not increased by the transmission of the second device and devices that do not have the NAV value T set may obtain TXOPs within their coverage. For instance, if the second device did not receive an MPDU that indicated a value T from the third device, it may obtain the TXOP while the first device is the transmitter in the TXOP.

Example embodiments of the invention include a signaling method that comprises the following steps:

participating by a first device in establishment of a first device pair with a second device;

participating by the first device in establishment of a simultaneous transmissions mode between the first device pair, and a second device pair including a third and fourth devices;

wirelessly receiving by the first device at least a portion of a first packet from the third device that was transmitted by the third device and destined for the fourth device, the at least portion of the first packet containing a length value and a wireless transmission rate value for the first packet;

calculating by the first device, a first duration for the first packet based on the length and transmission rate values;

generating by the first device, a second packet to be substantially simultaneously transmitted by the first device and destined for the second device, with a second duration that fits within the first duration of the first packet; and wirelessly transmitting by the first device, the second packet destined for the second device, substantially simultaneously with transmission of the first packet from the third device destined for the fourth device.

Example embodiments of the invention include a signaling method that further comprises detecting by the first device in a wireless medium, that it is frequently delayed in beginning transmissions to the second device, because the third device is a frequent user of the medium;

determining by the first device from addresses in packets received from the third device that the third device is transmitting its packets to the fourth device that has a link quality characteristic;

establishing by the first device, the first device pair with the second device by determining that the second device has a capability to participate as a receiver device with the first device being a transmitter device in the first device pair, in the simultaneous transmissions mode; and transmitting by the first device, a request to the third device to set up the simultaneous transmissions mode between the first device pair and a second device pair of the third device as a transmitter and the fourth device as a receiver, if the link quality characteristic of the fourth device satisfies a criterion.

Example embodiments of the invention include a signaling method that further comprises the link quality characteristic being that the second device does not receive packets transmitted by the third device or the link performance is poor with the third device.

Example embodiments of the invention include a signaling method that further comprises generating by the first device, the second packet to include a delay duration value to cause the second device to delay transmitting any packet until after the first duration of the first packet has elapsed.

Example embodiments of the invention include a signaling method that further comprises forming by the first device, the first device pair with the second device in the first device's coverage area and channel;

detecting by the first device, the second device pair including the third device in the first device's coverage area and channel, the third device paired with the fourth device that has a link quality characteristic;

transmitting by the first device, a simultaneous transmissions request to the third device, if the link quality characteristic of the fourth device satisfies a criterion; and receiving by the first device, a simultaneous transmissions response from the third device, indicating that the third device has formed the second pair with the fourth device.

Example embodiments of the invention include a signaling method that further comprises monitoring by the first device, the second device using a carrier sense multiple access with collision avoidance access method, prior to forming the first device pair with the second device; and transmitting by the first device, the second wireless message to the second device during the transmission of the first wireless message from the third device to the fourth device, the second wireless message indicating a duration during which no messages are received from the second device after forming the first device pair with the second device.

Example embodiments of the invention include a signaling method that further comprises monitoring by the first device, the second device and the third device and competing for transmission resources using a carrier sense multiple access with collision avoidance access method, prior to forming the first device pair with the second device; and transmitting by the first device to the second device the second wireless message substantially simultaneously with the first wireless message, the second wireless message indicating a duration during which no messages are received from the second device, after receiving by the first device, the first wireless message from the third device.

Example embodiments of the invention include a signaling method that further comprises storing by the first device, an allowed pairs information including identities of the devices in the first pair and the devices in the second pair, following receiving the simultaneous transmissions response from the third device.

Example embodiments of the invention include a signaling method that further comprises the steps of:

transmitting by the first device, a first simultaneous transmissions indication to the third device, indicating successful transmissions from the first device to the second device;

receiving by the first device, a second simultaneous transmissions indication from the third device, indicating successful transmissions from the third device to the fourth device; and determining by the first device from the first and second simultaneous transmission indications, whether to continue the simultaneous transmissions.

Example embodiments of the invention include a signaling method that further comprises transmitting by the first device, the second wireless message during the transmission by the third device of the first message formed as a physical layer convergence procedure (PLCP) protocol data unit (PPDU), without receiving any messages from the second device during a duration indicated in the first wireless message of the third device, to reuse transmission resources in the coverage area of the third device.

Example embodiments of the invention include a signaling method that further comprises monitoring by the first device, the second device and competing with the second device for transmission resources, using a carrier sense multiple access with collision avoidance access method, prior to forming the first device pair with the second device; and transmitting by the first device, the second wireless message to the second device without receiving any messages from the second device during a duration indicated in the second wireless message, after forming the first device pair with the second device;

wherein the third device and the fourth device initially compete for transmission resources using the carrier sense multiple access with collision avoidance access method, prior to forming the second device pair and subsequently the third device transmits the first wireless message to the fourth device, after forming the second device pair with the fourth device.

Example embodiments of the invention include a signaling method that further comprises monitoring by the first device, the third device;

detecting by the first device, the third device using excessive transmission resources in the operating channel of the first device; and transmitting by the first device, the simultaneous transmissions request to the third device to enable simultaneous transmissions with the third device.

Example embodiments of the invention include a signaling method that further comprises inferring from the receipt by the first device of the simultaneous transmissions response from the third device, that the third device has verified that simultaneous transmissions to the fourth device are possible to perform.

Example embodiments of the invention include a signaling method that further comprises the step of preparing by the first device, the second packet to include a delay duration value to cause the second device to delay transmitting any packet to the first device until after expiration of a transmission opportunity of the third device during which the first device has transmitted the second message.

Example embodiments of the invention may include a computer readable medium storing program instructions, which when executed by a computer processor, perform the steps of the above recited methods.

Example embodiments of the invention may include a wireless communications device, comprising:

at least one processor;

at least one memory including computer program code;

the at least one memory and the computer program code configured to, with the at least one processor, cause the device at least to:

participate by the device, which is a first device, in establishment of a first device pair with a second device;

participate by the first device in establishment of a simultaneous transmissions mode between the first device pair, and a second device pair including a third and fourth devices;

wirelessly receive by the first device at least a portion of a first packet from the third device that was transmitted by the third device and destined for the fourth device, the at least portion of the first packet containing a length value and a wireless transmission rate value for the first packet;

calculate by the first device, a first duration for the first packet based on the length and transmission rate values;

generate by the first device, a second packet to be substantially simultaneously transmitted by the first device and destined for the second device, with a second duration that fits within the first duration of the first packet; and wirelessly transmit by the first device, the second packet destined for the second device, substantially simultaneously with transmission of the first packet from the third device destined for the fourth device.

The resulting embodiments enhance capacity of a wireless communication network through spatial reuse of the shared communication medium.

DESCRIPTION OF THE FIGURES

FIG. 1Aa is an example timing diagram illustrating the operation of the wireless devices in FIG. 1A according to an embodiment of the present invention.

FIG. 1Ab is an example format for the physical layer convergence procedure (PLCP) protocol data unit (PPDU) in the IEEE 802.11 standard, illustrating the formats of its component physical layer convergence procedure (PLCP) and MAC Protocol Data Unit (MPDU) according to an embodiment of the present invention.

FIG. 1Ca is an example timing diagram illustrating the operation of the wireless devices in FIG. 1C according to an embodiment of the present invention.

FIG. 1Cb is an example flow diagram of a process for the first device STA1 transmitting a simultaneous transmit/receive capability request to the second device STA2 according to an embodiment of the present invention.

FIG. 1Cc is an example flow diagram of a process for the second device STA2 responding to the first device STA1 with a simultaneous transmit/receive capability response according to an embodiment of the present invention.

FIG. 1Da is an example timing diagram illustrating the operation of the wireless devices in FIG. 1D according to an embodiment of the present invention.

FIG. 1Db is an example flow diagram of a process for the first device STA1 transmitting a simultaneous transmissions request to device STA3 according to an embodiment of the present invention.

FIG. 1Ea is an example timing diagram illustrating the operation of the wireless devices in FIG. 1E according to an embodiment of the present invention.

FIG. 1Eb is an example flow diagram of a process for the third device STA3 transmitting a test message to the fourth device ST4 in PAIR(STA3,STA4) according to an embodiment of the present invention.

FIG. 1Ec is an example flow diagram of a process for the fourth device STA4 responding to the test message from STA3 in PAIR(STA3,STA4) according to an embodiment of the present invention.

FIG. 1Fa is an example timing diagram illustrating the operation of the wireless devices in FIG. 1F according to an embodiment of the present invention.

FIG. 1Fb is an example flow diagram of a process for the third device STA3 transmitting a simultaneous transmissions response to STA1 according to an embodiment of the present invention.

FIG. 1G shows the example wireless network diagram of FIG. 1F, wherein both the first device STA1 and the third device STA3 store an allowed pairs information in an allowed pairs table, including identities of the devices in the first pair and the devices in the second pair according to an embodiment of the present invention.

FIG. 1Ha is an example timing diagram illustrating the operation of the wireless devices in FIG. 1H according to an embodiment of the present invention.

FIG. 1Ia is an example timing diagram illustrating the operation of the wireless devices in FIG. 1I according to an embodiment of the present invention.

FIG. 1Ja is an example timing diagram illustrating the operation of the wireless devices in FIG. 1J according to an embodiment of the present invention.

FIG. 1Jb is an example timing diagram illustrating multiple TXOPs may occur during the same lifetime duration defined by simultaneous transmissions request according to an embodiment of the present invention.

FIG. 1Ka is an example timing diagram illustrating the operation of the wireless devices in FIG. 1K according to an embodiment of the present invention.

FIG. 1La is an example timing diagram illustrating the operation of the wireless devices in FIG. 1L according to an embodiment of the present invention.

FIG. 4 is an example flow diagram 400 of operational steps of an example embodiment of the signaling method carried out between the first, second, third, and fourth devices of FIGS. 1A to 1L.

FIG. 5 is an example flow diagram 450 of operational steps of an example embodiment of the signaling method in exchanging simultaneous transmissions indications of FIG. 1K.

FIG. 6 is an example flow diagram 480 of operational steps of an example embodiment of the signaling method carried out between the first, second, third, and fourth devices of FIGS. 1A to 1L.

DISCUSSION OF EXAMPLE EMBODIMENTS OF THE INVENTION

According to at least one embodiment of the present invention the throughput of a WLAN network may be improved by enabling the simultaneous transmission of multiple wireless signals from stations that do not interfere with one another because of the limited coverage range. Spatial Division Multiple Access (SDMA) may enable simultaneous transmission of multiple wireless signals by different devices in multi-station wireless local area networks (WLANs).

Figure 1A:
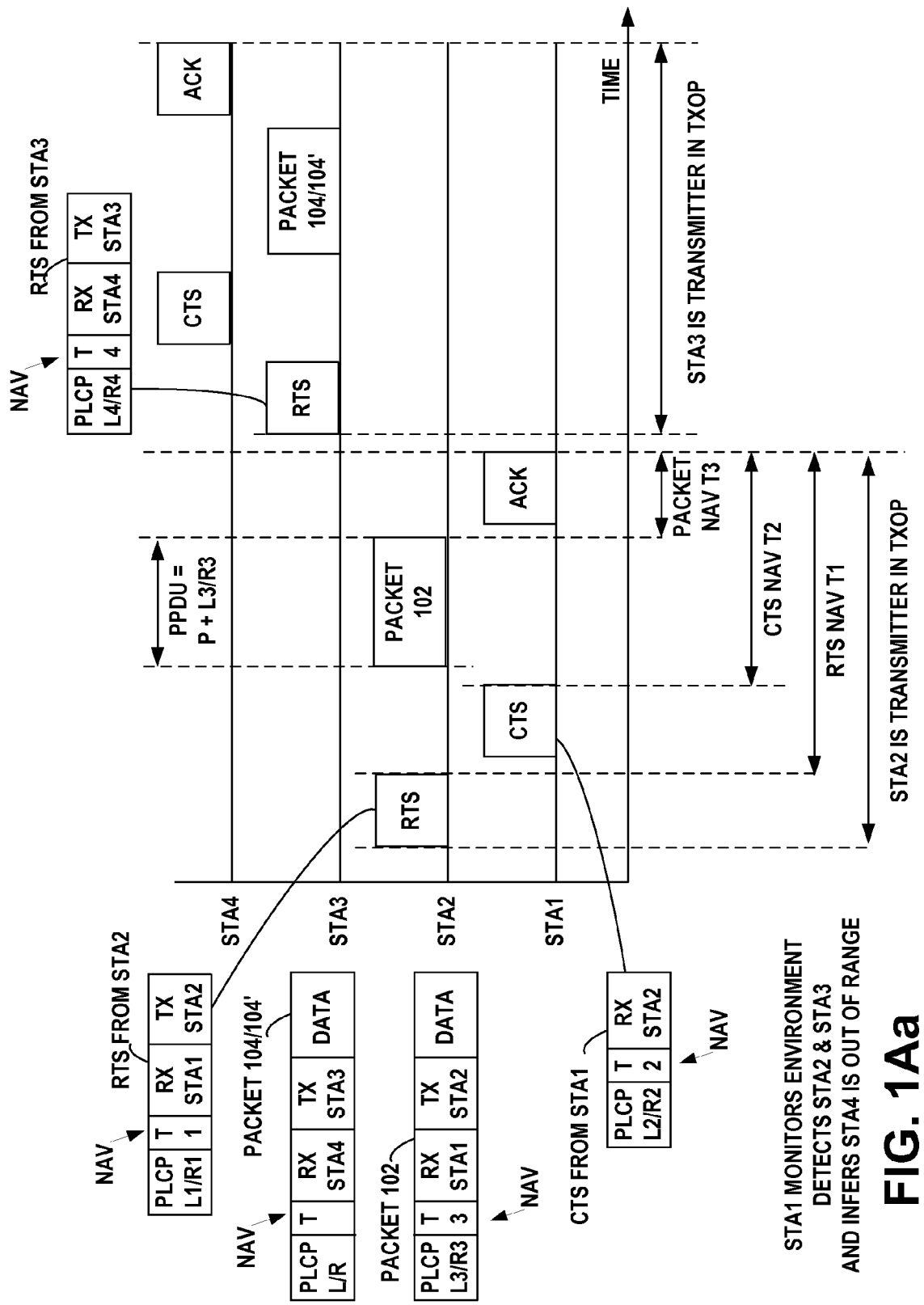
FIG. 1A is an example wireless network diagram of four wireless devices in a wireless local area network with a first device STA1 monitoring other wireless devices operating in the first device's coverage area according to an embodiment of the present invention.
Figure 1A:
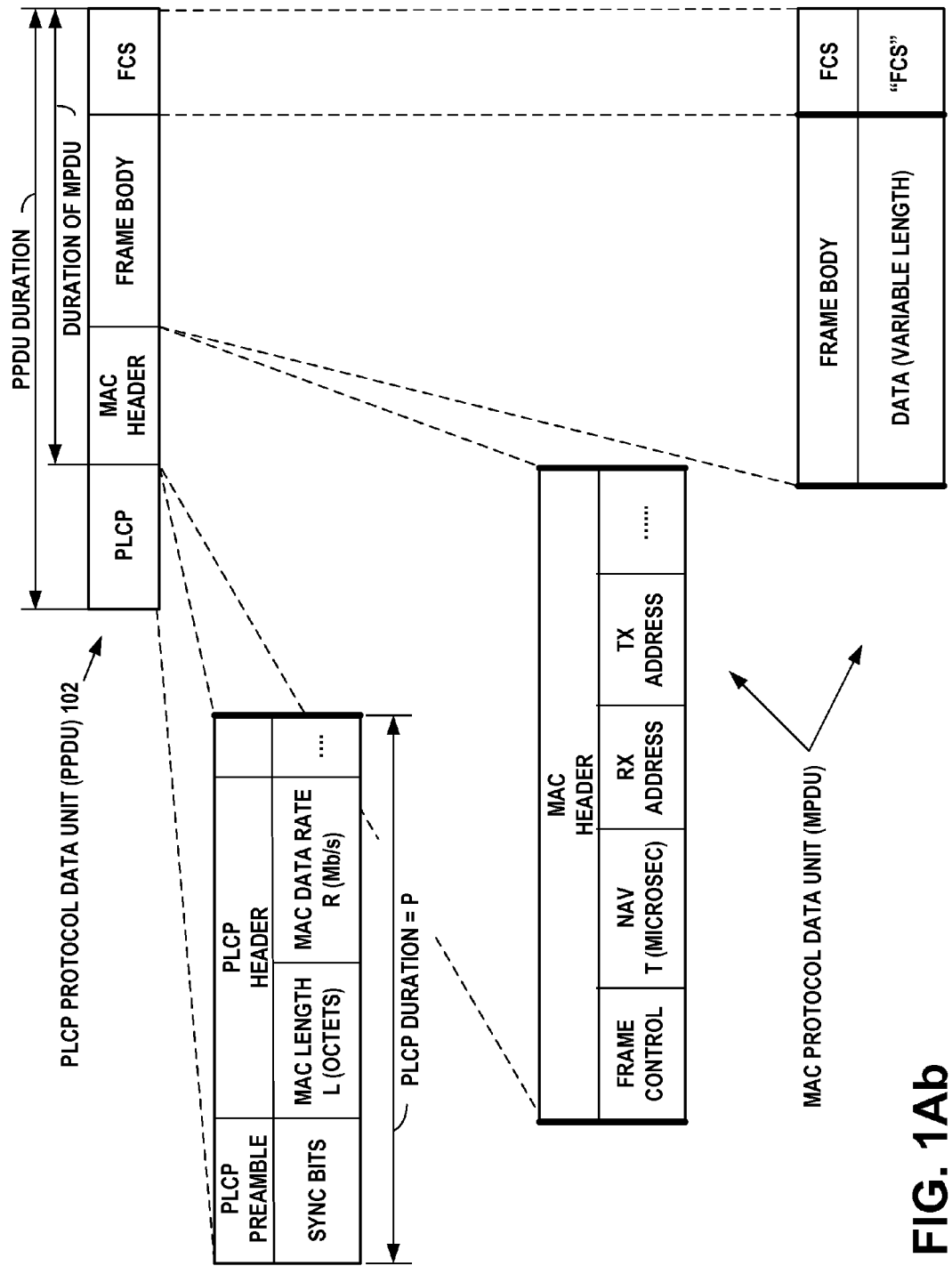

FIG. 1A is an example network diagram of four wireless devices in a wireless local area network with a first device monitoring other wireless devices operating in the first device's coverage area according to an embodiment of the present invention. The STA1 and STA2 may be in one network and STA3 & STA4 may be in another network. Alternately, STA1, STA2, and STA3 may be in the same network or all four devices may be in the same network. Spatial Division Multiple Access (SDMA) is used to enable simultaneous transmission of multiple wireless signals between allowed pairs of the devices STA1, STA2, STA3, and STA4 in wireless local area networks (WLANs). Example embodiments of the invention operate in all network topologies, including an IEEE 802.11 Basic Service Set (BSS), a Peer-to-peer BSS, a Mesh BSS (MBSS), an Independent BSS (IBSS) and a Tunneled Direct Link BSS (IEEE 802.11z). Example embodiments of the invention enhance the CSMA/CA access method operating in all frequency bands, for example from country specific white spaces between 50 and 700 MHz, the 2.4 GHz ISM band, the 5.0 GHz band for the IEEE 802.11ac standard, up beyond the 60 GHz band for the IEEE 802.11ad standard.

In an example scenario, the wireless devices STA1, STA2, STA3, and STA4 use the CSMA/CA access method of the IEEE 802.11 WLAN standard to gain access to the wireless medium. A first device STA1 detects that it is frequently delayed in beginning transmissions to a second device STA2, because a third device STA3 is a frequent user of the medium. The first device determines from the addresses in the packets it overhears from the third device that the third device is transmitting its packets to a fourth device STA4 whose reply transmissions are not received by the first device. The first device sends a query to the second device asking whether the second device receives the packets transmitted by the third device. If the second device replies that it does not receive packets transmitted by the third device or that the link performance is poor with the third device, then the first device recognizes that a cooperative arrangement may be possible with the third device, called a simultaneous transmissions mode. In order to set up a simultaneous transmissions mode, the first device may establish a device pair arrangement PAIR (STA1,STA2) with the second device by determining whether the second device has the capability to participate as a receiver device in a simultaneous transmissions mode arrangement. In a device pair, when the second device receives any transmissions from the first device, it delays sending any reply until after the expiration of the current transmit opportunity (TXOP) in which the first device has transmitted. If the second device has the capability, then the first device and second device establish a device pair.

Then, in the example scenario, the first device STA1 sends a proposal to the third device STA3 to set up a simultaneous transmissions mode, specifying that the arrangement would be between a first device pair PAIR(STA1,STA2) consisting of the first as the transmitter and second device as the receiver and a second device pair PAIR(STA3,STA4) consisting of the third device as the transmitter and the fourth device as the receiver. The third device makes a similar determination of the capabilities of the fourth device and whether the fourth device does not receive transmissions from the first device. If the third device responds and agrees with the proposed arrangement, then a simultaneous transmissions mode is established between the two pairs of devices, ALLOW[PAIR (STA1,STA2),PAIR(STA3,STA4)].

An objective in the simultaneous transmissions mode according to an embodiment of the present invention is to enable the first and third devices to simultaneously transmit packets to their respective second and fourth receiving devices in the first and second device pairs, even though the first and third devices are within each other's coverage areas. In the example scenario, this is accomplished by juxtaposing the physical packets so that the second transmitted packet does not terminate later that the first transmitted packet. For example, when the third device STA3 begins by transmitting a first packet to the fourth device STA4, the first device STA1 will also receive the first packet and will recognize from its addresses that it is satisfies the condition for simultaneous transmission. The first packet will have the standard IEEE 802.11 frame format, which is a PLCP protocol data unit (PPDU). The PPDU represents the physical packet as it is transmitted in the RF medium. The PPDU consists of a physical layer conversion procedure (PCLP) preamble, a PLCP header, and a MAC protocol data unit (MPDU). The PLCP header includes the length L of the MPDU and its data rate R. From these values, the first device calculates the duration of the PPDU of both the first packet and the second packet. According to an embodiment of the present invention, the duration of the PPDU of the second physical packet to be simultaneously transmitted by the first device STA1 to the second device STA2, fits within the duration of the PPDU of the first physical packet sent from the third device to the fourth device.

In the example scenario, the second device STA2 is obliged by its paired arrangement with the first device STA1, to delay transmitting any packet until after the expiration of the current transmit opportunity (TXOP) in which the first device has transmitted the second message. The NAV value T is defined in the packets transmitted by the third device STA3. The value of T is decremented as time passes, so that the value of T that the first device STA1 inserts into the MPDU of the second packet and transmits to the second device STA2, is the remaining duration before the expiration of the NAV. Thus, the protection area to avoid interference and transmission collisions is increased and second device STA2 knows by how much it delays any replies to the first device after receiving the second packet. In another embodiment, the value T that the first device STA1 inserts into MPDU of the second packet and transmits to the second device STA2, is set to zero (0). Thus, the coverage of the NAV protection is not increased by the transmission of the second device and devices which do not have the NAV value T set may obtain TXOPs at their coverage. For instance, if STA2 did not receive an MPDU that indicated a value T from STA3, it may obtain the TXOP while STA1 is the transmitter in the TXOP.

Figure 1B:
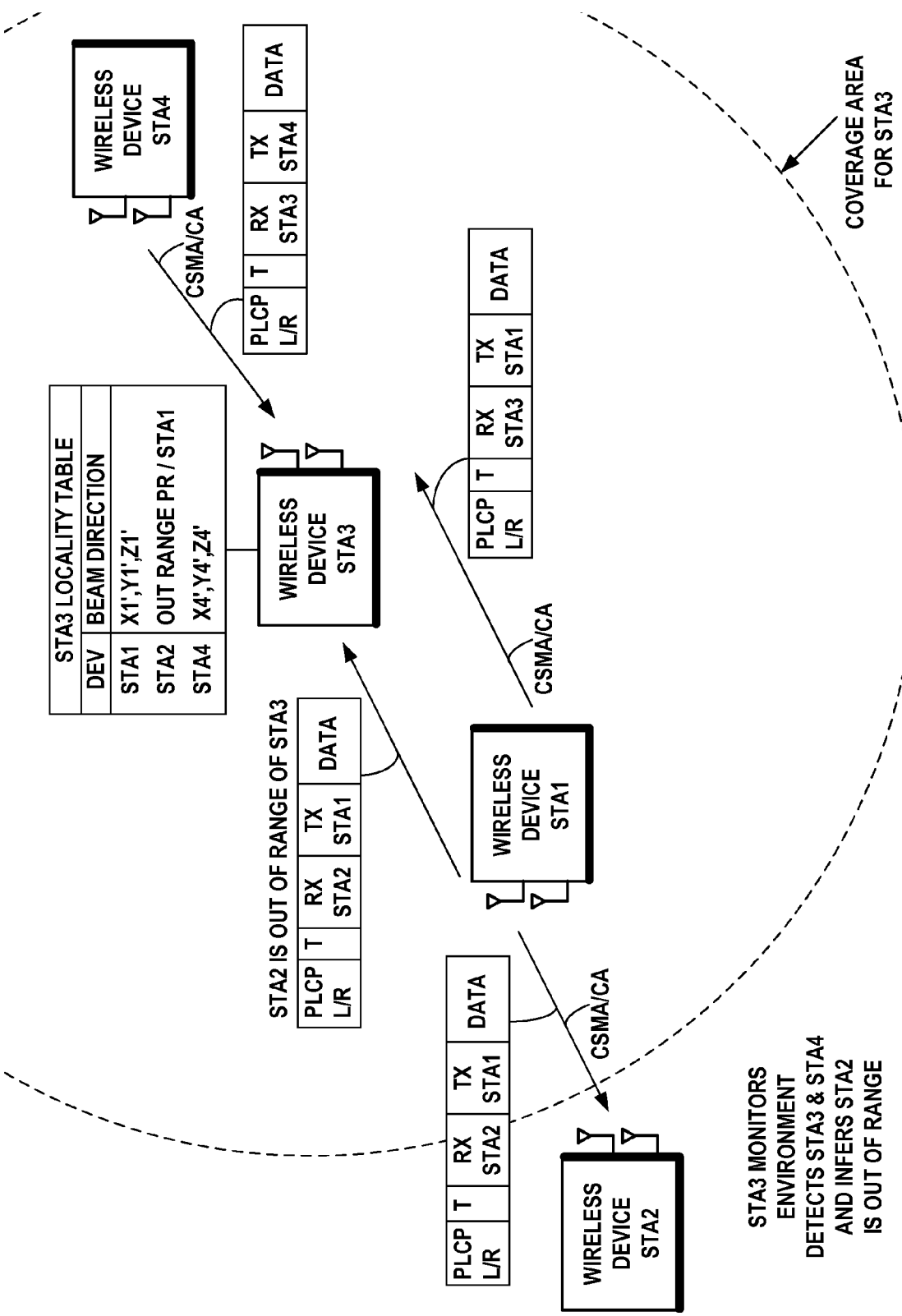
FIG. 1B shows the example wireless network diagram of FIG. 1A, wherein the third device STA3 is shown monitoring other wireless devices operating in the third device's coverage area according to an embodiment of the present invention.

FIG. 1A shows the first device STA1 competing with the second device STA2 and the third device STA3 for transmission resources using the carrier sense multiple access with collision avoidance (CSMA/CA) access method according to an embodiment of the present invention. In the IEEE 802.11 protocols, CSMA/CA may be carried out by the exchange of a Request to Send (RTS) packet sent by the sender and a Clear to Send (CTS) packet sent in reply by the intended receiver, alerting all other devices within range of the sender or the receiver, to refrain from transmitting for the duration of the main packet. The network allocation vector (NAV) is an indicator maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame update their NAV with the information received in the duration field T for all frames where the new NAV value is greater than the current NAV value, including the RTS and CTS packets, as well data packets. FIG. 1B shows the third device STA3 competing with the fourth device STA4 and the first device STA1 for transmission resources using the CSMA/CA access method.

An example embodiment of the signaling method invention may be setup by selecting the transmitter and receiver tuplet or pair for simultaneous transmissions. The devices monitor the transmissions that are ongoing in the media and may listen to other transmitters in the media as shown in FIGS. 1A and 1B. By listening to the media, the device may detect that it does not move while it operates, i.e. the link quality remains constant. Thus, it may advantageously perform beam steering and maximize the capacity in the link. If transmission rate adaptation and beam steering are performed, the device may also detect that another transmitter is using a significant quantity of transmission resources in the same operating channel. If the device identifies another device that transmits a large quantity of data, it may propose the setup of a simultaneous transmissions mode. The transmitter and receiver pairs should be located so that the receiver of a first tuplet 1 or pair receives minimal or no signals from the transmitter in the second tuplet 2 or pair, and vise versa. The example topology is shown in FIGS. 1A and 1B.

The first device STA1 of FIG. 1A is shown monitoring other wireless devices operating in the first device STA1's coverage area and channel, and the first device STA1 is competing with the other devices STA2 and STA3 for transmission resources. The first device STA1 is shown detecting packets 102, 103, and 104' from the second and third wireless devices STA2 and STA3 and compiling a locality table of the beam direction or other location information of the detected devices. The first device STA1 is shown receiving a packet 104' from the third device STA3, which indicates in the address fields of the packet 104' that the third device STA3 is communicating with a fourth wireless device STA4 that has poor link performance with the first device STA1 or is out of range of the first device STA1. The first device STA1 notes in its locality table that there is a fourth device STA4 that has poor link performance or is out of range, but that the third device STA3 is able to communicate with the fourth device STA4.

FIG. 1Aa is an example timing diagram illustrating the operation of the wireless devices in FIG. 1A according to an embodiment of the present invention. According to the CSMA/CA access method, timing of the RTS and its associated data packet 102 are shown as sent by STA2 to STA1 and the CTS and ACK associated with packet 102 is shown as sent by STA1. Similarly, according to the CSMA/CA access method, the timing of the RTS and its associated packet 104 are shown as sent by STA3 to STA4 and the CTS and ACK associated with packet 104 is shown as sent by STA4. Packet 104' is similar to packet 104, which is shown being received by STA1, but was addressed by STA3 to STA4. STA1 can infer from this overheard packet that STA4 has that has poor link performance with STA1 or is out of range of STA1.

The IEEE 802.11 enhanced distributed channel access (EDCA) contention access is an extension of the CSMA/CA mechanism to include priorities. The contention window and backoff times in CSMA/CA are adjusted to change the probability of a STA gaining medium access to favor higher priority classes. Each priority is mapped to one of four access categories (AC). Under EDCA, STAs use the same CSMA/CA access mechanism and contend on an equal basis at a given priority. A STA that wins an EDCA contention is granted a transmission opportunity (TXOP), which is the right to use the medium for a period of time. The duration of this TXOP is specified for each access category. A STA may use a TXOP to transmit multiple frames within an access category. If the frame exchange sequence has been completed and there is still time remaining in the TXOP, the STA may extend the frame exchange sequence by transmitting another frame in the same access category. The STA ensures that the transmitted frame and any necessary ACK can fit into the time remaining in the TXOP.

The network allocation vector (NAV) is an indicator of time periods when transmission onto the wireless medium will not be initiated by a STA. STAs receiving a valid frame will update their NAV with the information received in the duration field T for all frames where the new NAV value is greater than the current NAV value, including the RTS and CTS packets, as well data packets. FIG. 1Aa shows the example RTS packet transmitted by STA2 has a NAV T1 for a duration from the end of the RTS packet to the end of the ACK packet transmitted by STA1 as a reply to STA2. STA2 is the transmitter in TXOP. This RTS effectively prevents other STAs within the coverage area of STA2 from transmitting during the TXOP. The CTS packet transmitted by STA1 has a NAV T2 for a duration continuing from the end of the CTS packet to the end of the ACK packet transmitted by STA1 as a reply to STA2. This CTS effectively prevents other STAs within the coverage area of STA1 from transmitting during the TXOP. The data packet 102 transmitted by STA2 has a NAV T3 for a duration continuing from the end of the data packet 102 to the end of the ACK packet transmitted by STA1. The overall duration of the physical packet 102 is discussed in the following paragraph.

FIG. 1Ab is an example format for the physical layer convergence procedure (PLCP) protocol data unit (PPDU) in the IEEE 802.11 standard, illustrating the formats of its component physical layer convergence procedure (PLCP) and MAC Protocol Data Unit (MPDU) according to an embodiment of the present invention. The packets, such as 102, 103, 104 and 104', are generally organized with the standard IEEE 802.11 frame format described in the IEEE 802.11-2007, "Wireless Medium Access Control (MAC) and Physical Layer (PHY) Specifications," June 2007. The format for the physical packet transmitted through the RF medium is the PPDU frame format, which consists of three parts: the PLCP preamble, the PLCP header, and the MAC Protocol Data Unit (MPDU). The PLCP Preamble provides synchronization bits to synchronize the physical layer radios of the communicating STAs. The PLCP Header provides, among other information elements, transmission rate R and length L of the MPDU that may be applied to calculate the overall duration of the PPDU. The MAC header contains frame control information, the duration T that is applied to set the duration for NAV for virtual carrier sensing protection after the transmitted packet, the address of the intended receiving STA, and the address of the transmitting STA. In the case of RTS and CTS packets, the duration value T is the remaining duration of the NAV protected time that the transmitter of the TXOP may use to for transmitting the data packet with which they are associated. The frame body contains the variable length payload of the packet, which may be management or control parameters, data, or encapsulated envelopes of data. The Frame Check Sequence (FCS) field is a check sum to verify the integrity of the MAC header and payload. The PLCP, itself, has a known number of bits and data rate for each type of transmission modulation in the IEEE 802.11 standard, and has a duration P. The overall duration of the PPDU is the sum of the duration P of the PLCP and the duration of the MPDU computed from the transmission rate R and length L. However, the PLCP length P is on the order of 100 bits, which may be considered negligible and may be ignored when compared to the much larger length of the MPDU, which may be as large as 32,000 bits.

The STA1 and STA2 may operate, for example, in the same BSS, independent BSS (IBSS) or mesh BSS. If devices operate in the same BSS, they may have established a tunneled direct link that enables the devices to transmit directly between the non-access point (AP) STAs. It is also possible that either of STA1 and STA2 is an access point (AP) and the other is a non-AP STA (normal terminal).

Similarly, the STA 3 and STA 4 may operate for example in the same BSS, independent BSS (IBSS) or mesh BSS. If devices operate in the same BSS, they may have established a tunneled direct link that enables the devices to transmit directly between the non-AP STAs. It is also possible that either of STA3 and STA4 is an AP and the other is a non-AP STA (normal terminal).

In example embodiments of the invention in networks operating at less than 6 GHz, the devices may be located so that simultaneous, parallel transmissions are possible or the devices may have simple mechanisms for beam steering. To overcome the larger path losses in a 60 GHz radio band, beamforming techniques may used in embodiments of the invention. The beamforming techniques adjust multi-element antenna systems at both the transmitter and receiver to enable transmitting and receiving wireless signals in the optimum beam-direction in order to maximize the signal to noise ratio (SNR) for a single spatial data stream. To extend the range of coverage in the 60 GHz millimeter band, antenna systems may be equipped with beam steering capability to focus in the best directions for transmission and reception.

FIG. 1B shows the example network diagram of FIG. 1A, wherein the third device STA3 is shown monitoring other wireless devices STA1 and STA4 operating in the third device STA3's coverage area and channel according to an embodiment of the present invention. The third device STA3 is competing with the fourth device STA4 and the first device STA1 for transmission resources using the CSMA/CA access method. The third device STA3 is shown detecting the first STA1 and the fourth STA4 wireless devices and compiling a locality table of the beam direction of the detected devices. The third device STA3 is shown receiving a packet from the first device STA1 that indicates the first device STA1 is communicating with the second wireless device STA2 that has poor link performance or is out of range of the third device STA3. The third device STA3 notes in its locality table that there is a second device STA2 that has poor link performance or is out of range, but that the first device STA1 is able to communicate with the second device STA2.

Example embodiments of the invention detect ongoing transmissions as shown in FIGS. 1A and 1B. Each STA monitors the ongoing transmissions in the media:

The devices receive PLCP preamble to synchronize with the transmitter.

The devices receive PLCP header that contain the transmission rate and number of octets of the PLCP protocol data unit (PPDU) in transmission. From these fields the duration of the remaining PPDU transmission may be calculated.

The PLCP headers are followed by the MAC Headers which define the receiver and transmitter addresses, transmission capabilities, and duration for NAV.

The MAC Headers are followed by the payload that contains logical link control (LLC) and sub-network access protocol (SNAP) headers and the actual transmitted payload and its L3 headers. The traffic aggregation schemes (A-MSDU and A-MPDU) that were introduced in the IEEE 802.11n protocol, enable multiple MAC-level service data units (MSDUs) and MAC-level Protocol Data Units (MPDUs) (IP datagram and necessary headers) aggregation to the same transmitted payload. Two types of aggregation are defined:

Aggregation of MAC Service Data Units (MSDUs) at the top of the MAC (referred to as MSDU aggregation or A-MSDU)

Aggregation of MAC Protocol Data Units (MPDUs) at the bottom of the MAC (referred to as MPDU aggregation or A-MPDU).

Aggregation is a process of packing multiple MSDUs or MPDUs together to reduce the overheads and increase the size of the transmitted PPDUs, thus increasing the transmitted data size at user level data rate. A-MPDU aggregation requires the use of Block Acknowledgement or BlockAck, which was introduced in the IEEE 802.11e protocol and has been optimized in the IEEE 802.11n protocol. Block acknowledgments improve TXOP efficiency by allowing 802.11e devices to transmit consecutive frames without intermediate ACKs required by the receiver. Instead, the receiver sends a single block ACK to indicate success or failure of reception for each frame transmitted. IEEE 802.11n frame aggregation and reduced interframe spacing reduce the transmission idle periods between consecutive frames. Several frames may be included in a single packet. IEEE 802.11n devices may use the Reverse Direction protocol to grant part of their TXOP to be used for frame reception, so that a previously receiving device may send in the reverse direction without the need for a backoff interval.

The payload is followed by the Frame Check Sequence (FCS) that is 32-bit CRC sum that provides correctness for both MAC headers and payload.

Before the simultaneous transmission mode is established, a transmitter requests the capabilities of a receiver to operate with no acknowledgement or alternately a block acknowledgement transmission during a subsequent transmit opportunity (TXOP). The capabilities to support such acknowledgement formats may be detected through other means, for example, an access point (AP) in a BSS may know the capabilities of the terminals associated with it or a mesh STA in a mesh BSS may know its peer mesh STA capabilities from mesh peering.

Figure 1C:
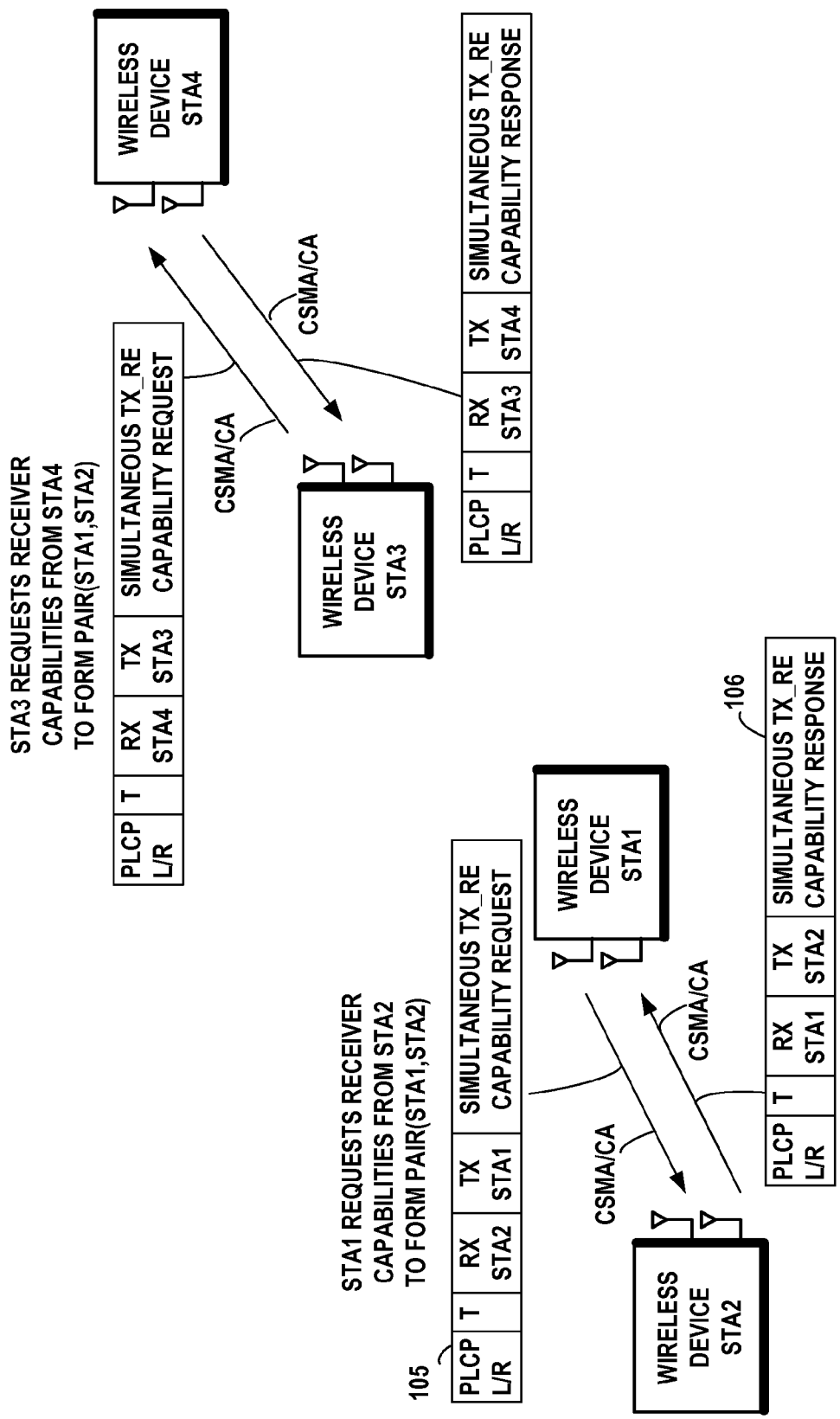
FIG. 1C shows the example wireless network diagram of FIG. 1B, wherein the first device STA1 transmits a simultaneous transmit/receive capability request to the second device STA2 and the third device STA3 transmits a simultaneous transmit/receive capability request to the fourth device STA4 according to an embodiment of the present invention.
Figure 1C:
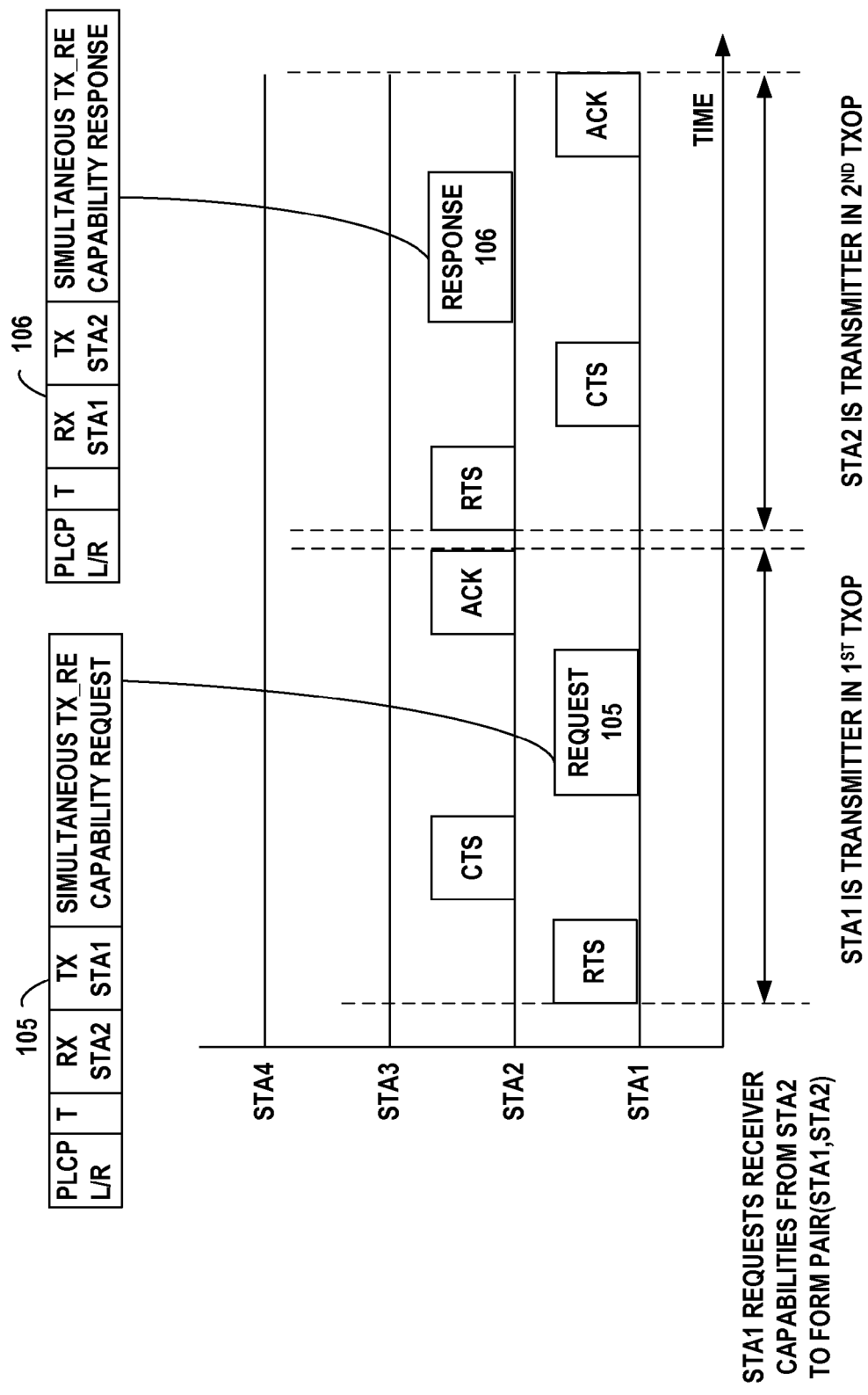
Figure 1C:
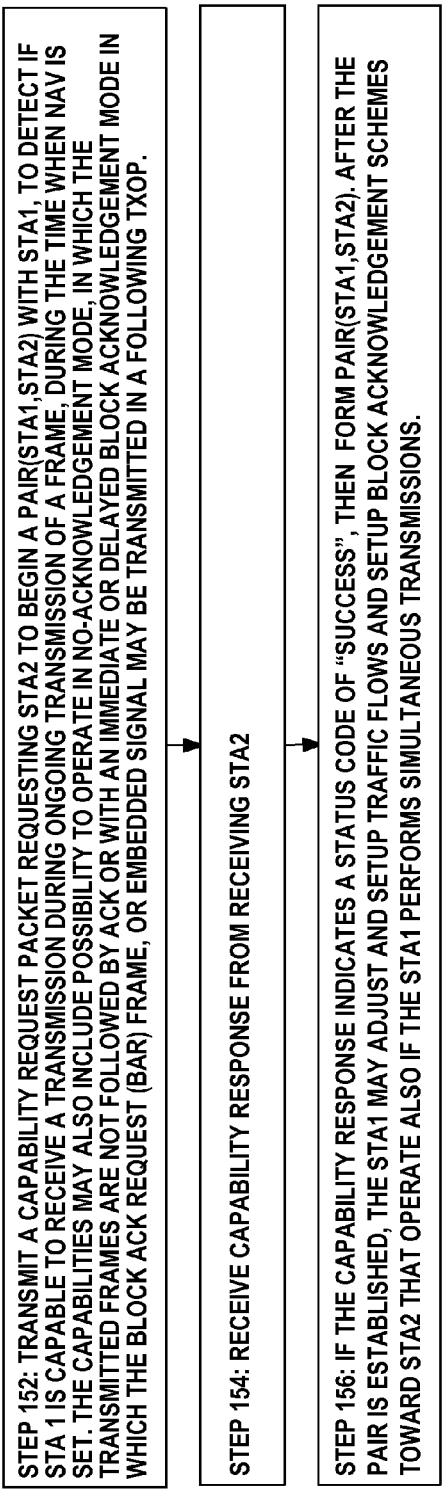
Figure 1C:
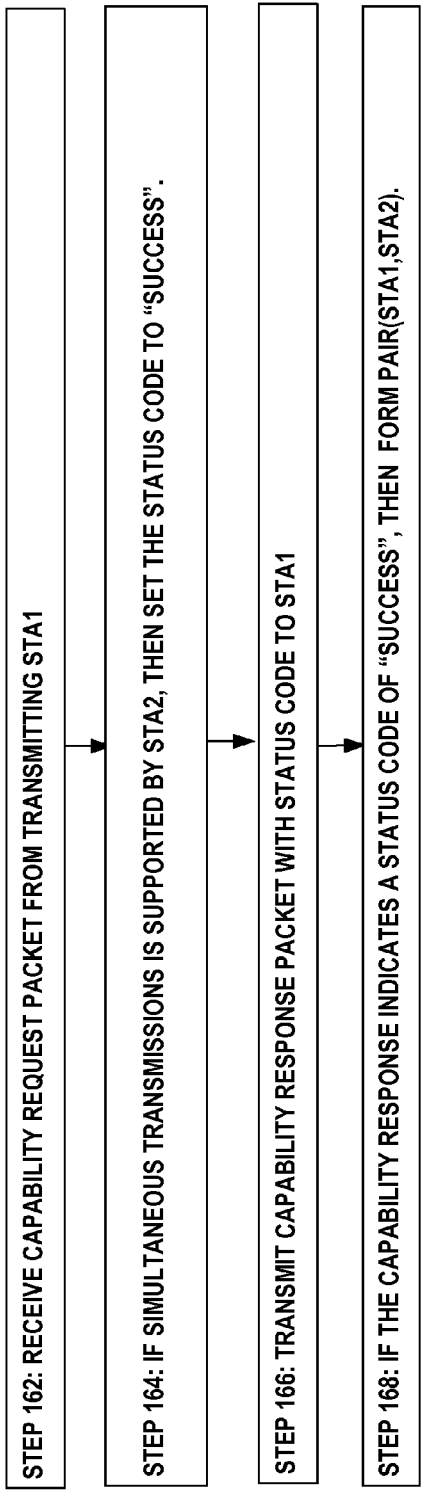
Figure 1D:
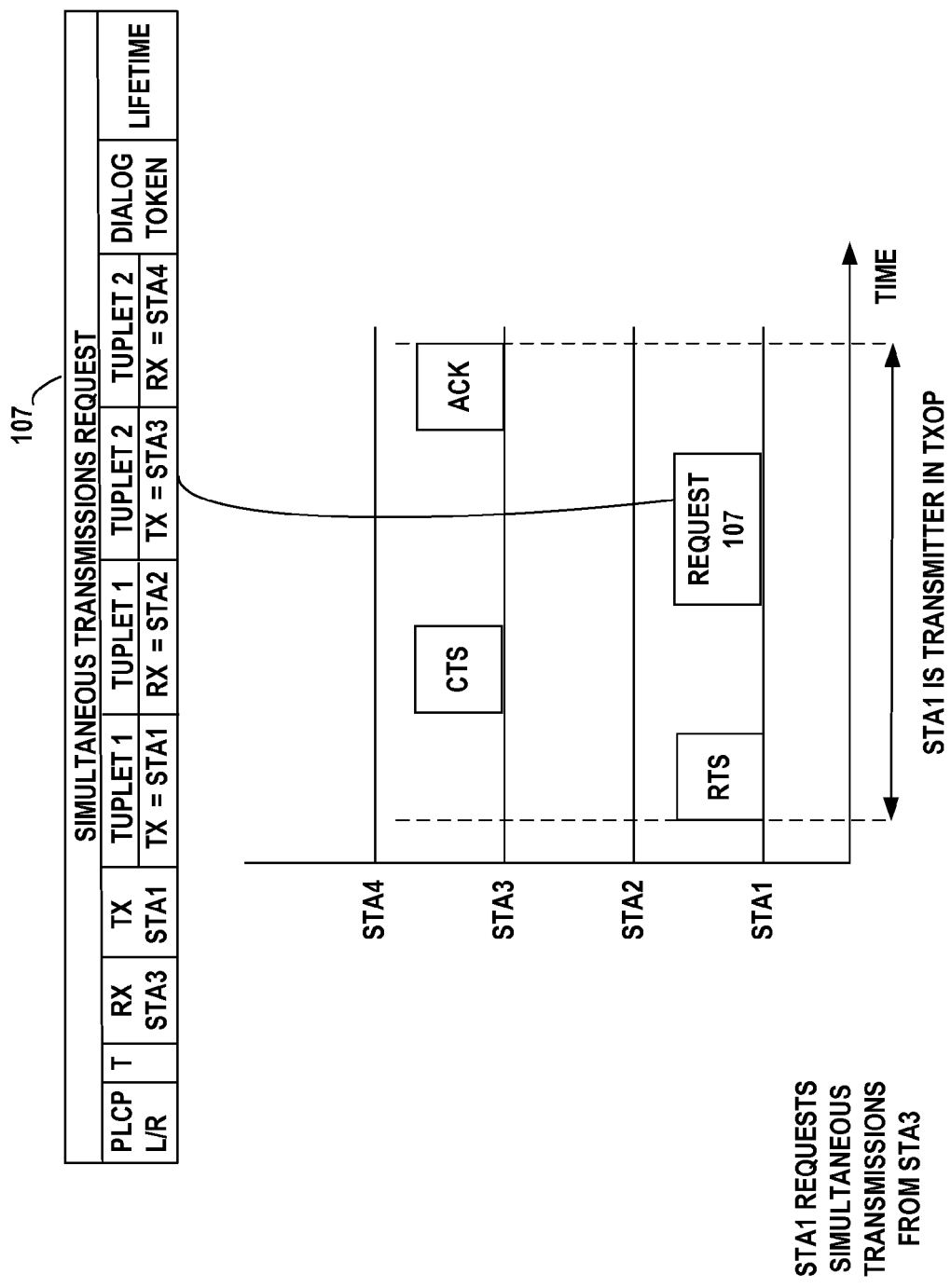
FIG. 1D shows the example wireless network diagram of FIG. 1C, wherein the first device STA1 is shown transmitting a simultaneous transmissions request to the third device STA3 to request setting up a simultaneous transmissions mode according to an embodiment of the present invention.

FIG. 1C shows the example network diagram of FIG. 1B, wherein the first device STA1 transmits a simultaneous transmit/receive capability request 105 to the second device STA2, to determine if the second device STA2 is capable of participating in a simultaneous transmission mode according to an embodiment of the present invention. The second device STA2 is shown responding by transmitting a simultaneous transmit/receive capability response 106 in reply to the first device STA1, which enables the first device STA1 to form a first device STA1 pair with the second wireless device STA2. SimultaneousTXReceivercapability.request and SimultaneousTXReceivercapability.response may be applied to exchange the receiver capability information for the frame formats, as shown in FIGS. 1C and 1D.

FIG. 1C shows the third device STA3 transmits a simultaneous transmit/receive capability request to the fourth device STA4, to determine if the fourth device STA4 is capable of participating in a simultaneous transmission mode. The fourth device STA4 responds by transmitting a simultaneous transmit/receive capability response in reply to the third device STA3, which enables the third device STA3 to form a second device pair with the fourth wireless device STA4.

FIG. 1Ca is an example timing diagram illustrating the operation of the wireless devices in FIG. 1C according to an embodiment of the present invention. According to the CSMA/CA access method, the timing of the RTS and its associated packet 105 for the simultaneous TX_RE capability request are shown as sent by STA1 to STA2 and the CTS associated with packet 105 is shown as sent by STA2. STA1 is the transmitter in the first TXOP. Similarly, according to the CSMA/CA access method, timing of the RTS and its associated packet 106 for the simultaneous TX_RE capability response are shown as sent by STA2 to STA1 and the CTS associated with packet 106 is shown as sent by STA1. STA2 is the transmitter in the second TXOP.

FIG. 1Cb is an example flow diagram 150 of a process for the first device STA1 transmitting a simultaneous transmit/ receive capability request to the second device STA2 according to an embodiment of the present invention. The steps are:

Step 152: Transmit a capability request packet requesting STA2 to begin a PAIR(STALSTA2) with STA1, to detect if STA 1 is capable to receive a transmission during ongoing transmission of a frame, during the time when NAV is set. The capabilities may also include possibility to operate in no-acknowledgement mode, in which the transmitted frames are not followed by acknowledgement or with an immediate or delayed block acknowledgement mode in which the Block ACK request (BAR) frame, or embedded signal may be transmitted in a following TXOP.

Step 154: receive capability response from receiving STA2

Step 156: if the capability response indicates a status code of "success", then form PAIR(STALSTA2). After the PAIR is established, the STA1 may adjust and setup traffic flows and setup block acknowledgement schemes toward STA2 that operate also if the STA1 performs simultaneous transmissions.

FIG. 1Cc is an example flow diagram 160 of a process for the second device STA2 responding to the first device STA1 with a simultaneous transmit/receive capability response according to an embodiment of the present invention. The steps are:

Step 162: receive capability request packet from transmitting STA1

Step 164: if simultaneous transmissions is supported by STA2, then set the status code to "success".

Step 166: transmit capability response packet with status code to STA1

Step 168: if the capability response indicates a status code of "success", then form PAIR(STA1,STA2).

Example embodiments of the invention enable reuse of a TXOP for devices that have setup a simultaneous transmissions mode. In this mode, an arrangement has been made between device pairs (transmitter device, receiver device) to allow selected pairs to communicate at a same time. A device pair is expressed as Pair(A, B), where A and B stand for the transmitting device and receiving device, respectively. The arrangement between allowed pairs of devices is expressed as Allow[Pair(A,B), Pair(C,D)], and the simultaneous transmissions mode is as follows:

The expression "Allow[Pair(A,B), Pair(C,D)]" may signify that a simultaneous transmissions mode has been established for the device A to transmit to the device B in parallel with a transmission from the device C to the device D.

Each device may have multiple device pair arrangements.

If the device A or the device C detects some other transmission than that allowed by one of its device pair arrangements, the device A shall not transmit.

In the example embodiment of FIG. 1A, four devices STA1, STA2, STA3, and STA4 are located in the same area. In normal enhanced distributed coordination access (EDCA) operational mode, when STA2 transmits, the STA 3 is blocked, i.e. physical and virtual carrier sensing deny the parallel transmissions.

However, in example embodiments of the invention, the STAs in the topology may easily form two transmitter and receiver pairs:

Pair 1, STA 1 transmits to STA 2
Pair2, STA 3 transmits to STA 4.

Because the STA 2 and STA 4 are located remotely from each other or the physical environment blocks the signals between these nodes, they are not able to hear each other. In this case the STA 1 may transmit to STA 2 and STA 3 may transmit to STA 4 successfully at the same time.

FIG. 1D shows that the first device STA1 has determined from its locality table that there may be a possibility that the third device STA3 may have formed a device pair with the fourth device STA4 that has poor link performance with the first device STA1 or is out of range of the first device STA1 according to an embodiment of the present invention. The first device STA1 is shown transmitting a simultaneous transmissions request 107 to the third device STA3 to request setting up a simultaneous transmissions mode. The STA 1 has detected that it cannot receive frames from STA 4 and it has proposed a simultaneous transmission mode to STA3. This mode allows STA 1 to transmit when STA 3 is transmitting to STA 4 and likewise the STA 3 may transmit when STA 1 transmits to STA 2.

SimultaneousTransmissions.request

The transmitter of either tuplet or pair transmits simultaneousTransmission.request to transmitter of the other tuplet as shown in FIG. 1D. The simultaneousTransmission.request requests the establishment of the simultaneous transmission mode. An example format of the SimultaneousTransmissions.Request is shown in Table 1.

TABLE 1

| content of the SimultaneousTransmissions.request frame | | | | | |
|---|---|---|---|---|---|
| Octets: 6 | 6 | 6 | 6 | 1 | 2 |
| Tuplet 1 transmitter address | Tuplet 1 receiver address | Tuplet 2 transmitter address | Tuplet 2 receiver address | Dialog token | Lifetime |

Tuplet 1 transmitter address is 6 octets in length and contains the MAC address of the STA that transmits the request.

Tuplet 1 receiver address is 6 octets in length and contains the MAC address of the receiving node that will receive transmissions from the transmitter of the tuplet 1.

Tuplet 2 transmitter address is 6 octets in length and contains the MAC address of transmitter STA of the tuplet2.

Tuplet 2 receiver address is 6 octets in length and contains the MAC address of the receiver STA of the tuplet 2.

The Dialog Token field is one octet field and it is used for matching action responses with the requests.

The lifetime of the simultaneous_TX field is two octets and specifies the duration for the simultaneous transmission mode in units of one hundredth of second [0.01 s], unless it will be refreshed by sending an acknowledged SimultaneosTransmission.indication from transmitter of either tuplet or pair of the transmitter of the other tuplet. Value 0 indicates that lifetime of the simultaneous transmission mode is not applied.

FIG. 1Da is an example timing diagram illustrating the operation of the wireless devices in FIG. 1D according to an embodiment of the present invention. According to the CSMA/CA access method, the timing of the RTS and its associated packet 107 for the simultaneous transmissions request are shown as sent by STA1 to STA3 and the CTS associated with packet 107 is shown as sent by STA3. Note, that the transmission may be performed without RTS and CTS signaling and typically the transmitted MPDUs or MAC management protocol data units (MMPDUs) are acknowledged.

FIG. 1Db is an example flow diagram of a process for the first device STA1 transmitting a simultaneous transmissions request to device STA3 according to an embodiment of the present invention. The steps are:

Step 172: detect transmitter STA3 using a lot of transmission resources in the same operating channel.

Step 174: decide to set up simultaneous transmission mode between PAIR(STA1,STA2) and PAIR(STA3,STA4).

Step 176: transmit simultaneous transmissions request packet specifying PAIR(STA1,STA2), PAIR(STA3,STA4), and the proposed duration (LIFETIME) for the simultaneous transmission mode of PAIR(STA1,STA2) and PAIR(STA3, STA4).

Figure 1E:
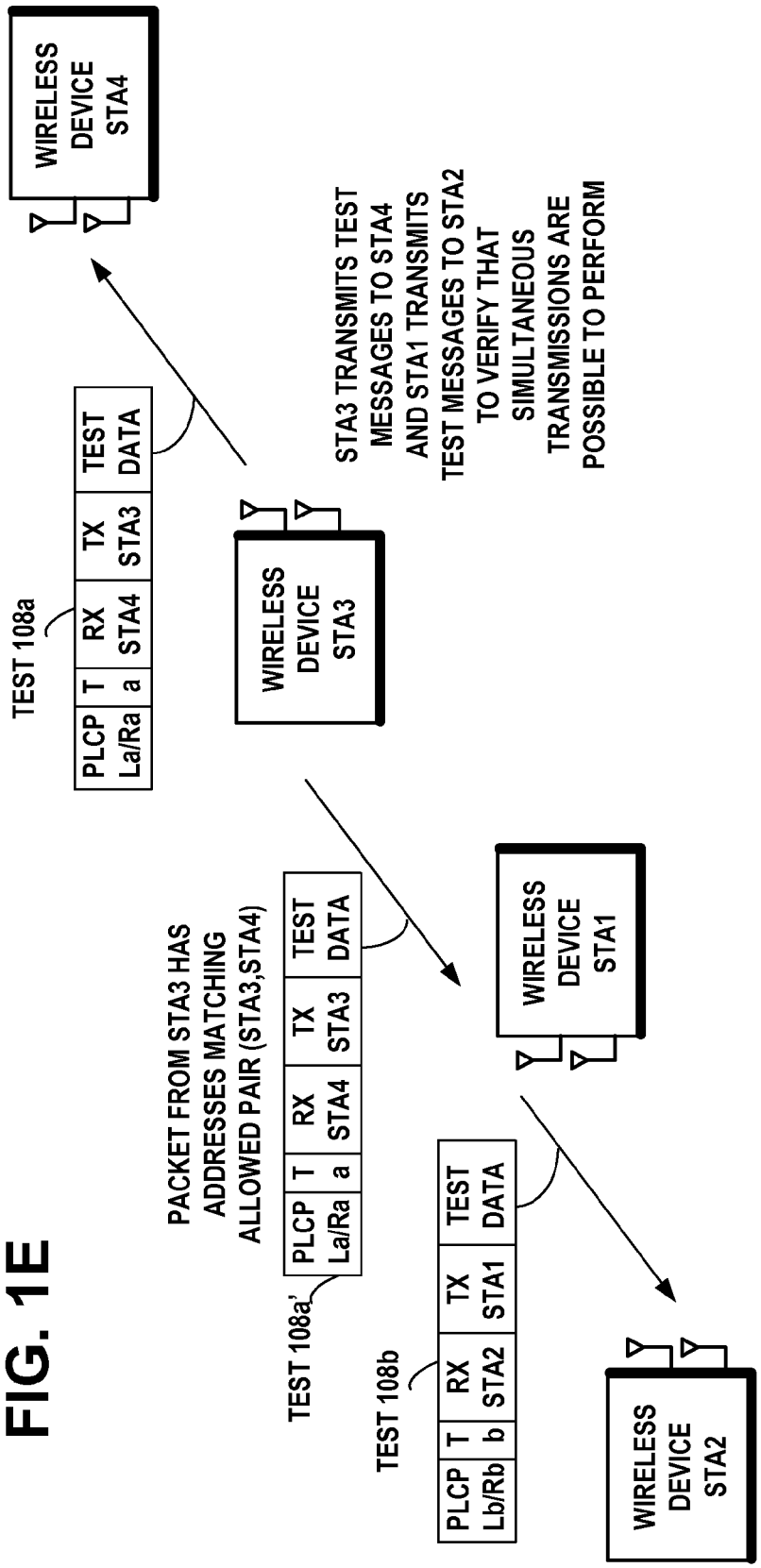
FIG. 1E shows the example wireless network diagram of FIG. 1D, wherein the third device STA3 is shown transmitting test messages to the fourth device STA4 to verify that the simultaneous transmissions are possible to perform according to an embodiment of the present invention.
Figure 1E:
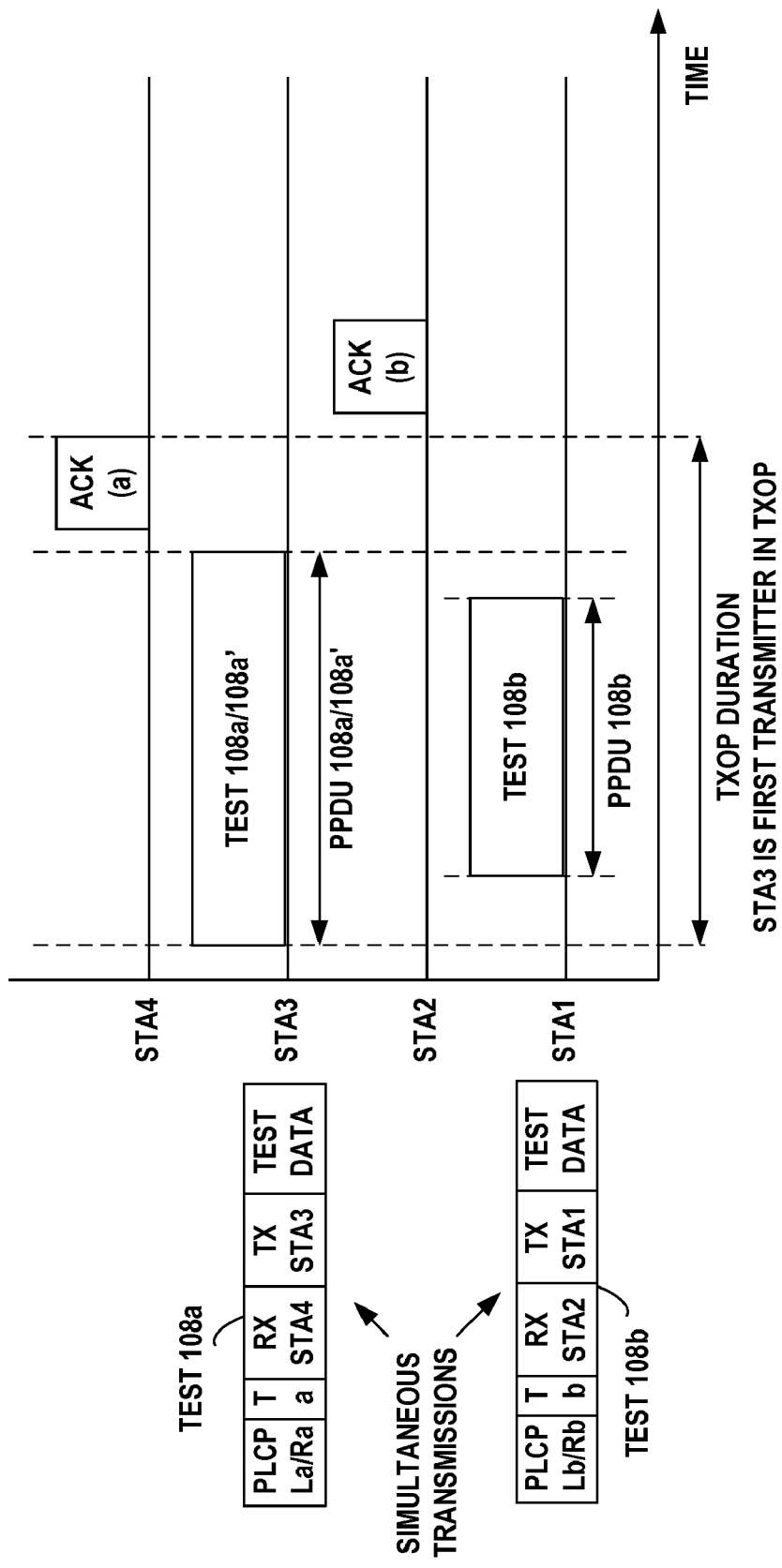

FIG. 1E shows the example wireless network diagram of FIG. 1D according to an embodiment of the present invention, wherein the third device STA3 is shown transmitting test messages 108a to the fourth device STA4 and the first device STA1 transmits test messages 108b to the second device STA2, to verify that the simultaneous transmissions are possible to perform. The normal simultaneous transmissions are performed for the test messages to have a realistic understanding, before the third device STA3 replies to the first device STA1 in the response frame 109, in order to test in practice the topology and operation. The first device STA1 receives, a wireless test message 108a' from the third device STA3, including the identities STA3 and STA4 of the devices in the second pair and a duration value for the first message, the wireless test message 108a having been transmitted from the third device STA3 to the fourth device STA4. Since the identities of the devices in wireless test message 108a' match the identities of the devices in the second pair, the first device STA1 is alerted to a transmission opportunity in which it may immediately conduct simultaneous transmissions of wireless test message 108b to the second device STA2 during the transmission by the third device STA3 of the wireless test message 108a, without interfering with the first message 108a.

After the simultaneousTransmission.request frame is successfully transmitted, both transmitters may perform the simultaneous transmissions. Before the receiver STA3 of the simultaneousTransmission.request responds, it should perform a few simultaneous transmissions and verify that the simultaneous transmissions are possible to perform.

FIG. 1Ea is an example timing diagram illustrating the operation of the wireless devices in FIG. 1E according to an embodiment of the present invention. STA3 is the first transmitter in the TXOP. STA3 transmits a test packet 108a to STA4 in PAIR(STA3,STA4). As an option, STA3 need not send an RTS, but may immediately transmit without an RTS, and rely on its physical and virtual carrier sensing. The TXOP has the duration of the PPDU 108a+SIFS+acknowledgement ACK(a) to PPDU 108a. SIFS is the Short Interframe Space. In response, STA1 transmits a second test packet 108b to STA2 in PAIR(STA1,STA2). The second test packet 108b has duration of its PPDU that does not terminate later than the termination of the PPDU of the first test packet 108a. ACK(b) is the acknowledgement to the second test packet 108b after the expiration of the TXOP.

FIG. 1Eb is an example flow diagram of a process for the first device STA1 transmitting test a message 108b to the second device STA2 according to an embodiment of the present invention. STA1 in response to detecting the test message 108a' from the third device STA3, prepares to simultaneously transmit the test message 108b to the second device STA2 in PAIR(STA1,STA2). The steps are:

Step 180: detect a test message transmission from STA3 to STA4 in PAIR(STA3,STA4).

Step 181: transmit a test message to STA2 in PAIR(STA1, STA2). (As an option STA1 need not send an RTS, but may immediately transmit without an RTS, and ignore its physical and virtual carrier sensing when the transmitter and receiver pair is STA3 and STA4.) Note that multiple test packets may be transmitted during multiple simultaneous frame transmissions.

Step 182: Obtain TXOP to request acknowledgement or block acknowledgement from STA2 to indicate delivery status of the test message. In some frame flows, the STA1 may also obtain TXOP to transmit the acknowledgement.

Step 183: verify that simultaneous transmissions are possible to perform.

FIG. 1Ec is an example flow diagram of a process for the second device STA2 responding to the test message 108b from STA1 in PAIR(STALSTA2) according to an embodiment of the present invention. The steps are:

Step 186: set the receiver on to receive test message from transmitting STA1

Step 187: if test packet is successfully received, then set the status code to "success".

Step 188: defer responding with ACK during the pendency of the TXOP for STA3's packet, and respond only after the STA1 requests with BAR or if the STA2 obtains new TXOP for response transmission.

Step 189: transmit ACK or response frame with status code to STA1

Figure 1F:
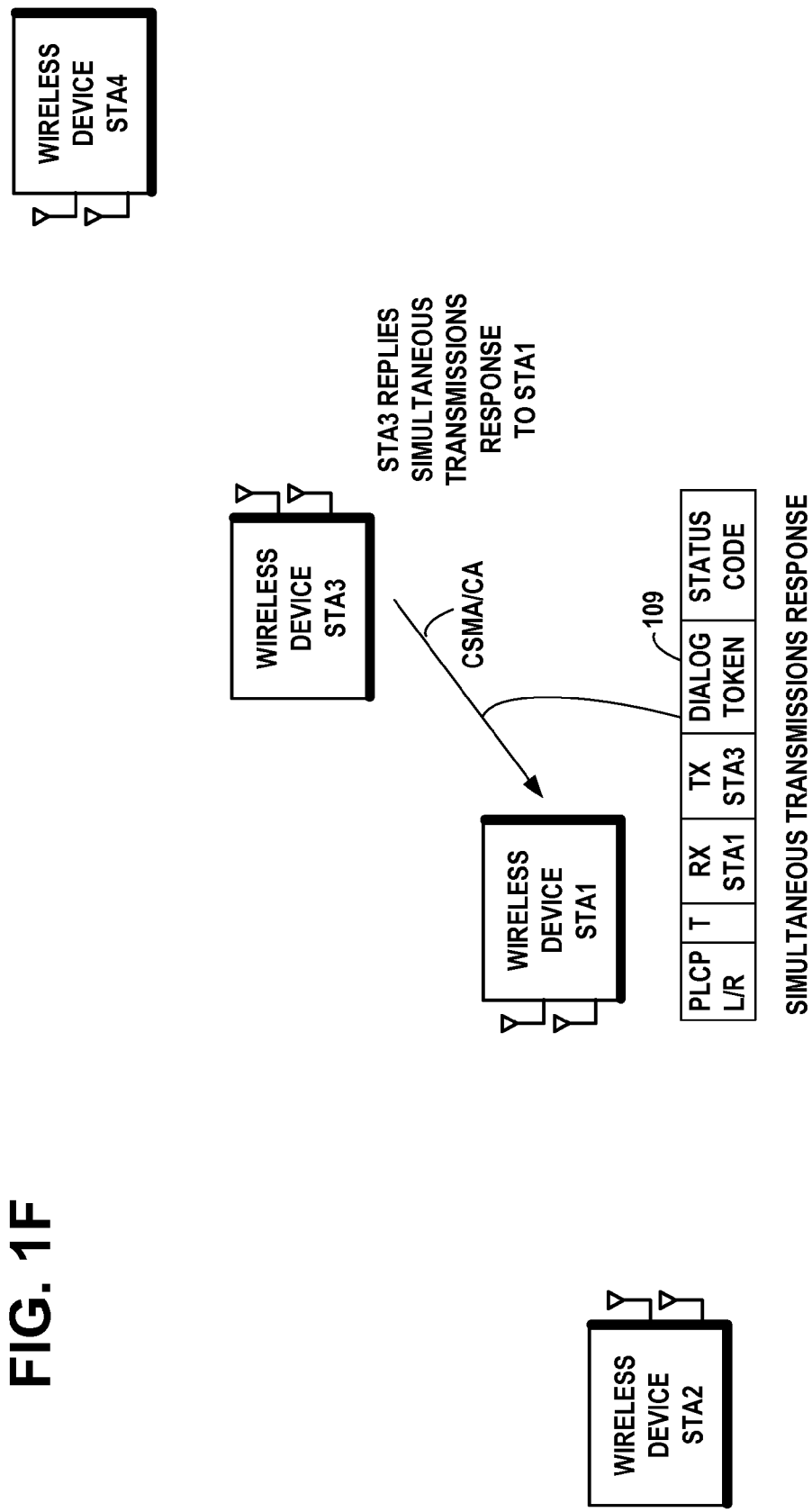
FIG. 1F shows the example wireless network diagram of FIG. 1E, wherein the third device STA3 transmits a simultaneous transmissions response in reply to the first device STA4 to set up the simultaneous transmissions mode according to an embodiment of the present invention.
Figure 1F:
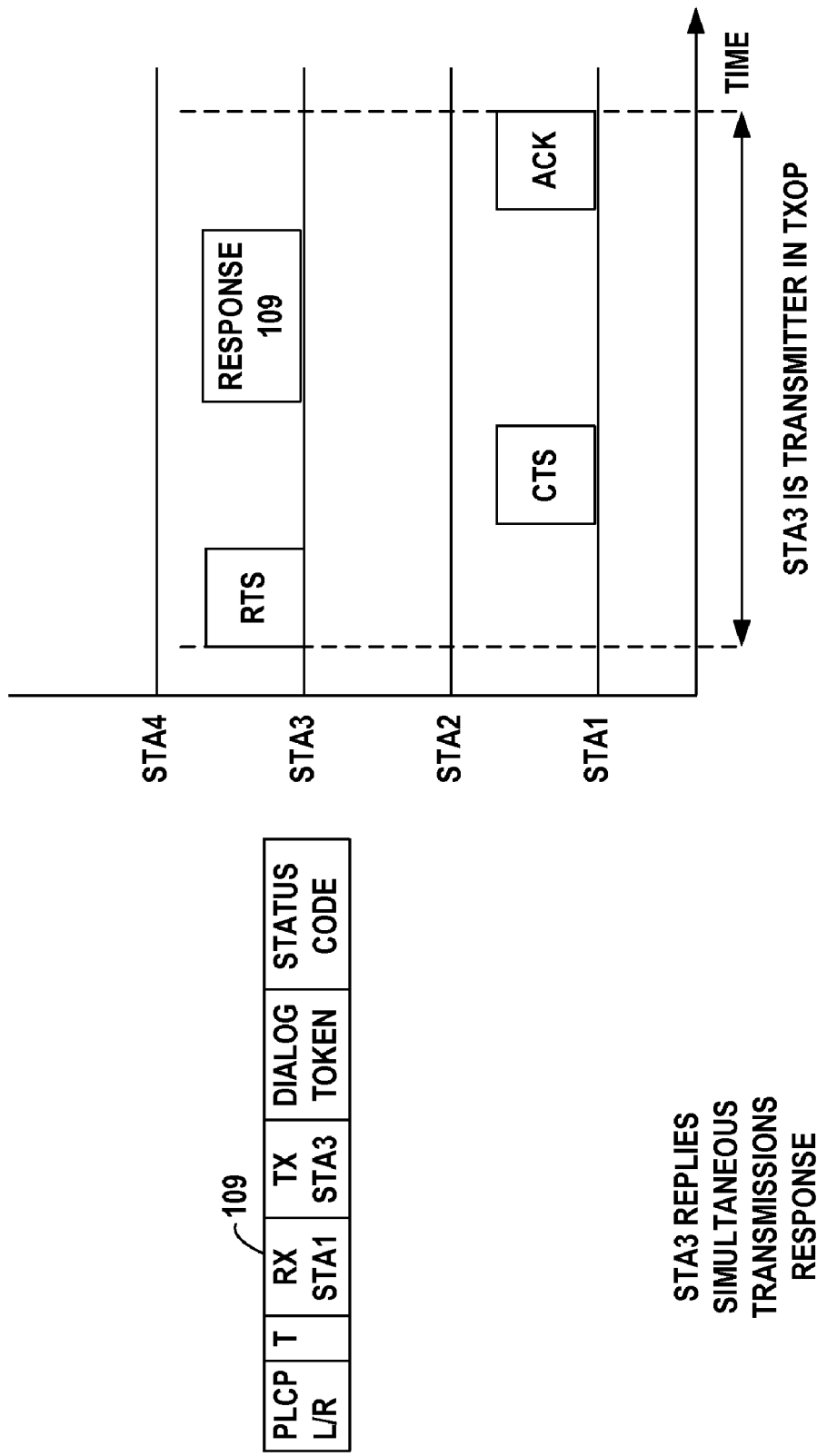

FIG. 1F shows the example network diagram of FIG. 1E according to an embodiment of the present invention, wherein the third device STA3 transmits a simultaneous transmissions response in reply to the first device STA1 to set up the simultaneous transmissions mode.

SimultaneousTransmissions.response

The requested STA3 transmits simultaneousTransmissions.response to respond to the requesting STA1, as shown in FIG. 1E. The content of the simultaneousTransmissions.response is shown in Table 2.

TABLE 2 content of the simultaneousTransmissions.response frame

| Octets: 1 | 1 |
|---|---|
| Dialog Token | Status Code |

The Dialog Token field is one octet field and it is set to the same value as in received request frame. The dialog Token field is used for matching responses with the requests.

The status code is one-octet in length and contains the status code of the simultaneous transmissions establishment. The values of the field are shown in the Table 3 below.

TABLE 3

Status code and their mapping

| Status Code | Explanation: |
|---|---|
| 0 | Success |
| 1 | Failure, simultaneous transmissions not supported |
| 2 | Failure, simultaneous transmissions resulting to collisions |
| 3 | Failure, not volunteer to set-up simultaneous transmission mode |
| 4 | Failure, simultaneous transmissions already setup, no support for new |
| 5-255 | Reserved |

FIG. 1Fa is an example timing diagram illustrating the operation of the wireless devices in FIG. 1F according to an embodiment of the present invention. According to the CSMA/CA access method, the timing of the RTS and its associated packet 109 for the simultaneous transmissions response are shown as sent by STA3 to STA1 and the CTS associated with packet 109 is shown as sent by STA1.

FIG. 1Fb is an example flow diagram of a process for the third device STA3 transmitting a simultaneous transmissions response to STA1 according to an embodiment of the present invention. The steps are:

Step 192: verify that simultaneous transmissions are possible to perform.

Step 194: if simultaneous transmissions feature is supported, if there would be no resulting collisions, if STA3 volunteers to participate in the simultaneous transmissions mode, and if such a mode has not already been set up in STA3 with no capacity for an additional mode, then set the status code to "success".

Step 196: transmit simultaneous transmissions response packet with status code to STA1.

FIG. 1G shows the example wireless network diagram of FIG. 1F according to an embodiment of the present invention, wherein both the first device STA1 and the third device STA3 store an allowed pairs information in an allowed pairs table, including identities of the devices STA1, STA2 in the first pair and the devices STA3, STA4 in the second pair. Devices STA1 and STA3 have setup the simultaneous transmissions mode. If either STA1 or STA3 receives a message with the PLCP header and the MAC header having the transmitter and receiver addresses that match with the setup tuplet or pair, the device may terminate the reception of the frame and start to initiate its own simultaneous transmission, as shown in FIG. 1H.

Figure 1H:
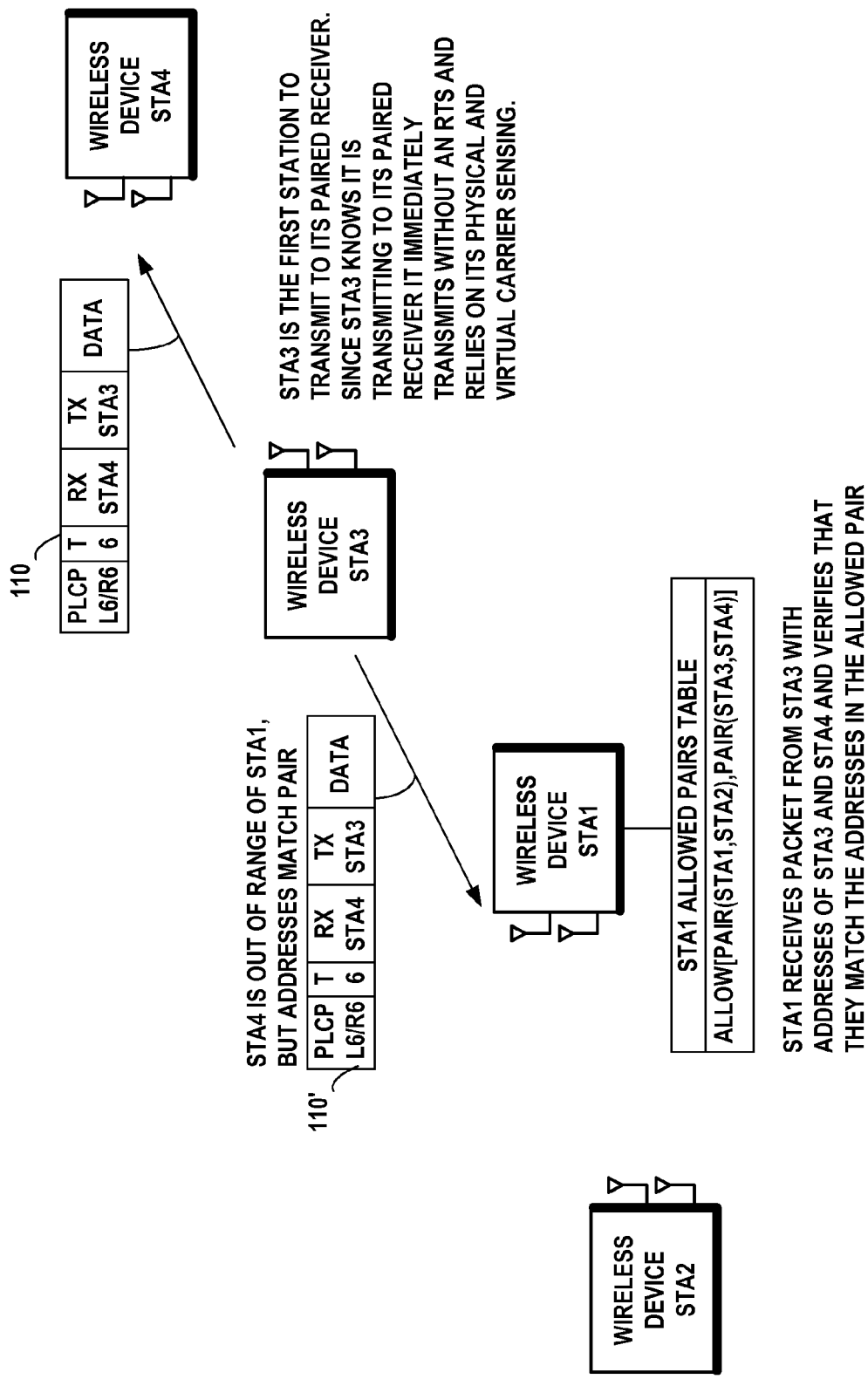
FIG. 1H shows the example wireless network diagram of FIG. 1G, wherein the first device STA1 receives, a first wireless message from the third device STA3, including the identities of the devices in the second pair and a duration value for the first message, the first message having been transmitted from the third device STA3 to the fourth device STA4 according to an embodiment of the present invention.
Figure 1H:
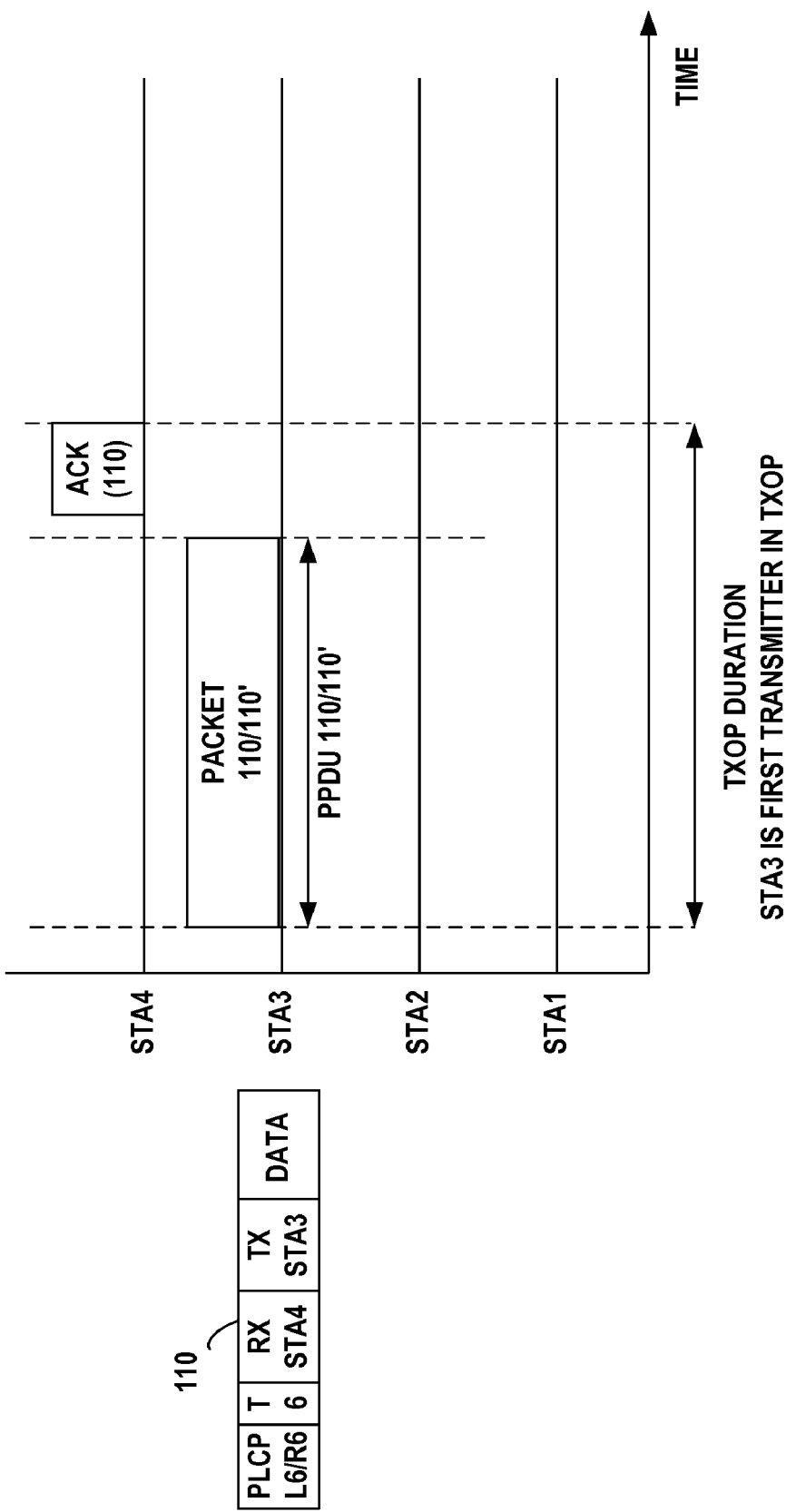

FIG. 1H shows the example wireless network diagram of FIG. 1G according to an embodiment of the present invention, wherein STA3 is the first to transmit wireless message 110/110'. The objective in the simultaneous transmissions mode is to enable the first and third devices to simultaneously transmit packets to their respective second and fourth receiving devices in the first and second device pairs, even though the first and third devices are within each other's coverage areas. In the example scenario, this is accomplished by juxtaposing the physical packets so that the second transmitted packet does not terminate later that the first transmitted packet. For example, when the third device STA3 begins by transmitting a first packet to the fourth device STA4, the first device STA1 will also receive the first packet and will recognize from its addresses that it is satisfies the condition for simultaneous transmission. The first packet will have the standard IEEE 802.11 frame format, which is a PLCP protocol data unit (PPDU). The PPDU represents the physical packet as it is transmitted in the RF medium. The PPDU consists of a physical layer conversion procedure (PCLP) preamble, a PLCP header, and a MAC protocol data unit (MPDU). The PLCP header includes the length L of the MPDU and its data rate R. From these values, the first device calculates the duration of the PPDU of both the first packet and the second packet. According to an embodiment of the present invention, the duration of the PPDU of the second physical packet to be simultaneously transmitted by the first device STA1 to the second device STA2, fits within the duration of the PPDU of the first physical packet sent from the third device to the fourth device.

The first device STA1 receives the first wireless message 110' from the third device STA3, including the identities of the devices STA3, STA4 in the second pair and the length L6 and data rate R6 values in the PLCP for the first message 110'. The duration of the PPDU of the first wireless message 110' may be calculated as a duration value L6/R6. The first message 110' has been overheard by STA1 as it was transmitted from the third device STA3 to the fourth device STA4. Since the identities of the devices STA3, STA4 in first wireless message match the identities of the devices STA3, STA4 in the second pair, as stored in the allowed pairs table, the first device STA1 is alerted to a transmission opportunity in which it may immediately conduct simultaneous transmissions to the second device STA2 during the transmission by the third device STA3 of the first message 110, without interfering with the first message 110. In the arrangement, only one STA owns the transmit opportunity (TXOP) at a time, in this case STA3, and it may freely transmit during the TXOP, as it desires.

If the STA3 transmits PLCP protocol data unit (PPDU) 110 to STA4, the STA1 may transmit simultaneously to STA2. STA1 will first receive PLCP and MAC headers and verify that the transmitter is STA3 and the receiver is STA4. From the received PLCP header the STA1 will calculate the duration of the PPDU transmission. The duration is calculated by dividing the number of octets (expressed in bits) in the transmitted MAC Protocol Data Unit (MPDU) as indicated in LENGTH field L of the PLCP header by the transmission rate of the frame as indicated in RATE field R of the PLCP header. The overall duration of the PPDU is the duration L/R of the MPDU plus the duration of the PLCP. The PLCP length is on the order of 100 bits, which may be considered negligible and may be ignored when compared to the length of the MPDU, which may be as large as 32,000 bits. The transmission from STA1 to STA2 shall not exceed the ending instant that the STA3 allocates for its PPDU transmission 110, i.e. the transmission shall end before the STA3 transmission start time+ duration calculated from PLCP header.

STA1 and STA2 may apply an acknowledgement scheme that does not require instant responses. The STA2 shall not transmit any kind of acknowledgement right after the STA1 transmission, because this transmission will collide with STA3 transmissions, i.e. it may corrupt acknowledgement from STA4 to STA3 or it may collide with STA3 transmission and STA1 will not be able to receive the transmission.

The CSMA/CA access method will provide TXOPs for all devices in the area and the acknowledgements from STA2 to STA1 may be transmitted in TXOPs, owned by STA2 or STA1.

The STA1 calculates the duration of the MAC headers and payload transmission from the PLCP rate R and length L fields, as shown in FIG. 1H. During this time the devices may transmit parallel transmissions. If the transmitter in other tuplet or pair has some frames to transmit, they may transmit the frames during the agreed time. However, the receiver in other tuplet may not acknowledge the transmissions that it receives. The transmitter and receiver may apply block acknowledgement scheme and collect the acknowledgements during their own TXOPs. The transmitter in TXOP coordinates and sets the transmission format for the receiver in TXOP. Thus, the receiver in simultaneous transmission mode does not necessarily need to know that the mode is in operation.

Since STA3 is the first station to transmit to its paired receiver, STA3 may optionally use CSMA/CA and send an RTS to STA4. More generally, however, since STA3 knows it is transmitting to its paired receiver STA4, as an option it need not send an RTS, but may immediately transmit without an RTS, and rely on its physical and virtual carrier sensing.

FIG. 1Ha is an example timing diagram illustrating the operation of the wireless devices in FIG. 1H according to an embodiment of the present invention. Since STA3 knows it is transmitting to its paired receiver STA4, as an option it may immediately transmit its packet 110 without an RTS, and rely on its physical and virtual carrier sensing. The TXOP has the duration of the PPDU 110+SIFS+acknowledgement ACK (110) to PPDU 110. The duration of the PPDU for packet 110/110' transmitted by STA3 is calculated from the length L6 and data rate R6 of its PLCP header. Simultaneous transmissions from STA1 to STA2 may be confined to the duration of the PPDU for packet 110/110'.

Figure 1I:
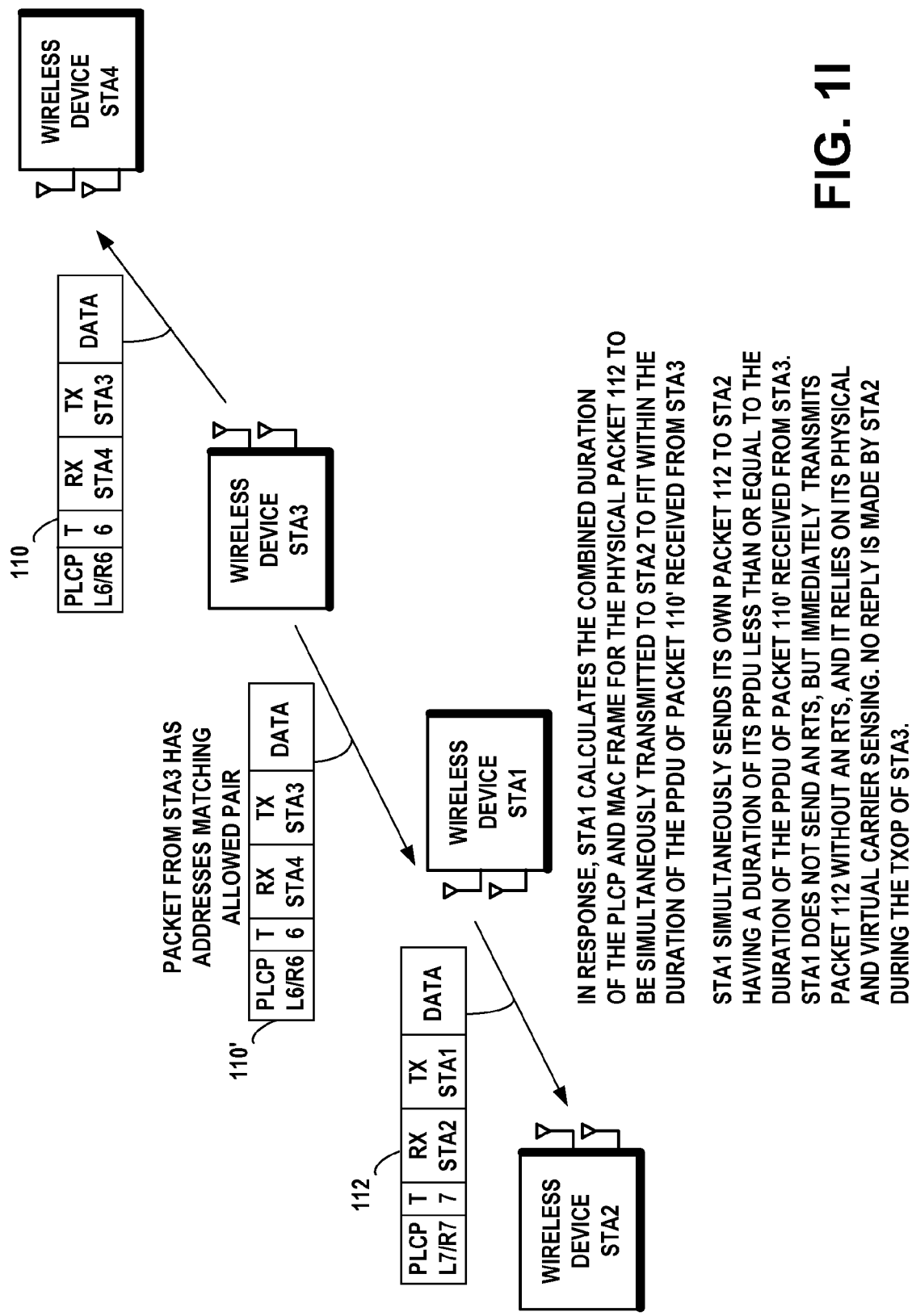
FIG. 1I shows the example wireless network diagram of FIG. 1H, wherein the first device STA1 calculates a duration of a second wireless message to be transmitted by the first device STA1 to the second device STA2 substantially simultaneously with the first message according to an embodiment of the present invention.
Figure 1A:
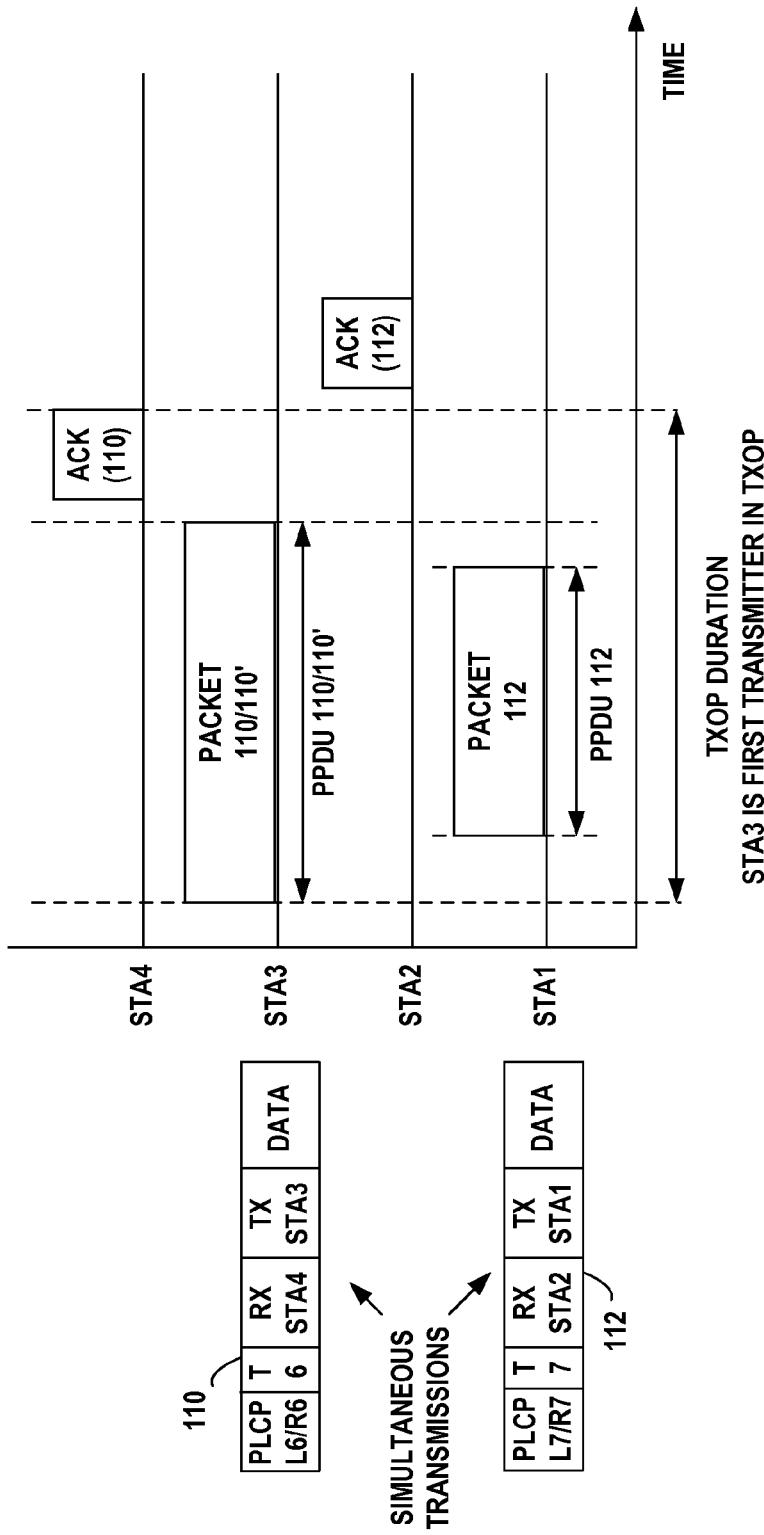

FIG. 1I shows the example network diagram of FIG. 1H according to an embodiment of the present invention, wherein the first device STA1 calculates, in response to the first message 110', a duration of the PPDU of the physical packet for a second wireless message 112 to be transmitted by the first device STA1 to the second device STA2 substantially simultaneously with the first message 110. The calculated duration of the PPDU for second wireless message 112 is such as to prevent the PPDU of the second message 112 from terminating later than the termination of the PPDU of the first message 110. The first device STA1 may then transmit to the second device STA2 the second wireless message 112 substantially simultaneously with the first wireless message 110, to reuse the transmission opportunity.

STA1 will have data queued for transmission in the second message 112 to STA2 and will construct the PLCP protocol data unit (PPDU) for the physical packet 112 consisting of the PLCP and the MAC Protocol Data Unit (MPDU). The PPDU will have an overall duration that will terminate before the end of the PPDU of the first message 110. To calculate the duration of the PPDU for the physical packet 112, STA1 adds the duration of the PLCP preamble and PLCP header to the duration of the MPDU containing the MAC header, the data payload, and the frame check sequence (FCS). The calculation of the duration of the MPDU takes the values from the PLCP header for the MAC length L6 in octets and divides the corresponding number of bits by the MAC data rate R6 from the PLCP header, in megabits per second. To this MPDU duration value L6/R6 may be added the duration P of the PLCP itself, which has a known number of bits and data rate for each type of transmission modulation in the IEEE 802.11 standard. For example, Section 14.3.2 of the IEEE 802.11-2007 standard provides that for a frequency hopping physical layer (PHY), the number of bits in the PLCP preamble is 96 bits and in the PLCP header is 32 bits. Section 14.3.3.1.2 of the standard provides that the PLCP preamble shall be transmitted at 1 Mb/s and be completed in 96 microseconds and the PLCP header shall be transmitted at 1 Mb/s and be completed in 32 microseconds. Thus, the duration P of the PLCP is 128 microseconds. It also provides that the variable length MPDU shall be transmitted at the selected data rate R. Thus, the overall duration of the PPDU is the sum of the durations for the PLCP and the MPDU or P+L6/R6. However, the PLCP length, which is on the order of 100 bits, may be considered negligible and may be ignored when compared to the much larger length of the MPDU, which may be as large as 32,000 bits. The overall duration of the PPDU may be calculated for the physical packet 112 so as to have a duration terminating not later than the end of the TXOP of STA3. By selecting a quantity of the queued data that will fit within the calculated duration for the packet 112, STA1 is able to transmit the packet 112 in parallel, substantially simultaneously, with the packet 110 transmitted by STA3 to STA4.

In another example, Section 15.2.2 of the IEEE 802.11-2007 standard provides that for a direct sequence spread spectrum PHY, the number of bits in the PLCP preamble is 144 bits and in the PLCP header is 48 bits. The data rate for transmitting the PLCP is 1 Mb/s differential binary phase shift keying (DBPSK).

In another example, Section 17.3.2 of the IEEE 802.11-2007 standard provides that for an orthogonal frequency division multiplexing (OFDM) PHY, the number of bits in the PLCP preamble is 12 bits and in the PLCP header is 40 bits.

In another example, Section 18.2.2.1 of the IEEE 802.11-2007 standard provides that for a high rate direct sequence spread spectrum PHY, the number of bits in the PLCP preamble is 144 bits and in the PLCP header is 48 bits. The data rate for transmitting the PLCP preamble is 1 Mb/s DBPSK and for the PLCP header is 2 Mb/s DBPSK.

In the example scenario, the second device is obliged by its paired arrangement with the first device, to delay transmitting any packet until after the first duration of the first packet has elapsed. The NAV value T is defined in the packets transmitted by the third device. The value of T is decremented as time passes, so that the value of T that the first device inserts into the MPDU of the second packet and transmits to the second device, is the remaining duration before the expiration of the NAV. Thus, the protection area to avoid interference and transmission collisions is increased and second device knows by how much it delays any replies to the first device after receiving the second packet. In another embodiment, the value T that the first device inserts into MPDU of the second packet and transmits to the second device, is set to zero (0). Thus, the coverage of the NAV protection is not increased by the transmission of the second device and devices that do not have the NAV value T set may obtain TXOPs at their coverage. For instance, if the second device did not receive an MPDU that indicated a value T from the third device, it may obtain the TXOP while the first device is the transmitter in the TXOP.

FIG. 1Ia is an example timing diagram illustrating the operation of the wireless devices in FIG. 1I according to an embodiment of the present invention. STA3 is the first transmitter in the TXOP. STA1 simultaneously sends its own packet 112 to STA2 having duration less than or equal to duration of the PPDU of the packet 110' received from STA3. STA1 may not send an RTS, but may immediately transmit without an RTS, and rely on the detection by STA3 of any extraneous transmissions. Because RTS is not used, no reply is made by STA2 until after the first duration of the first packet sent be STA3 has elapsed. ACK(112) is the acknowledgement to the packet 112 after the expiration of the TXOP.

Figure 1J:
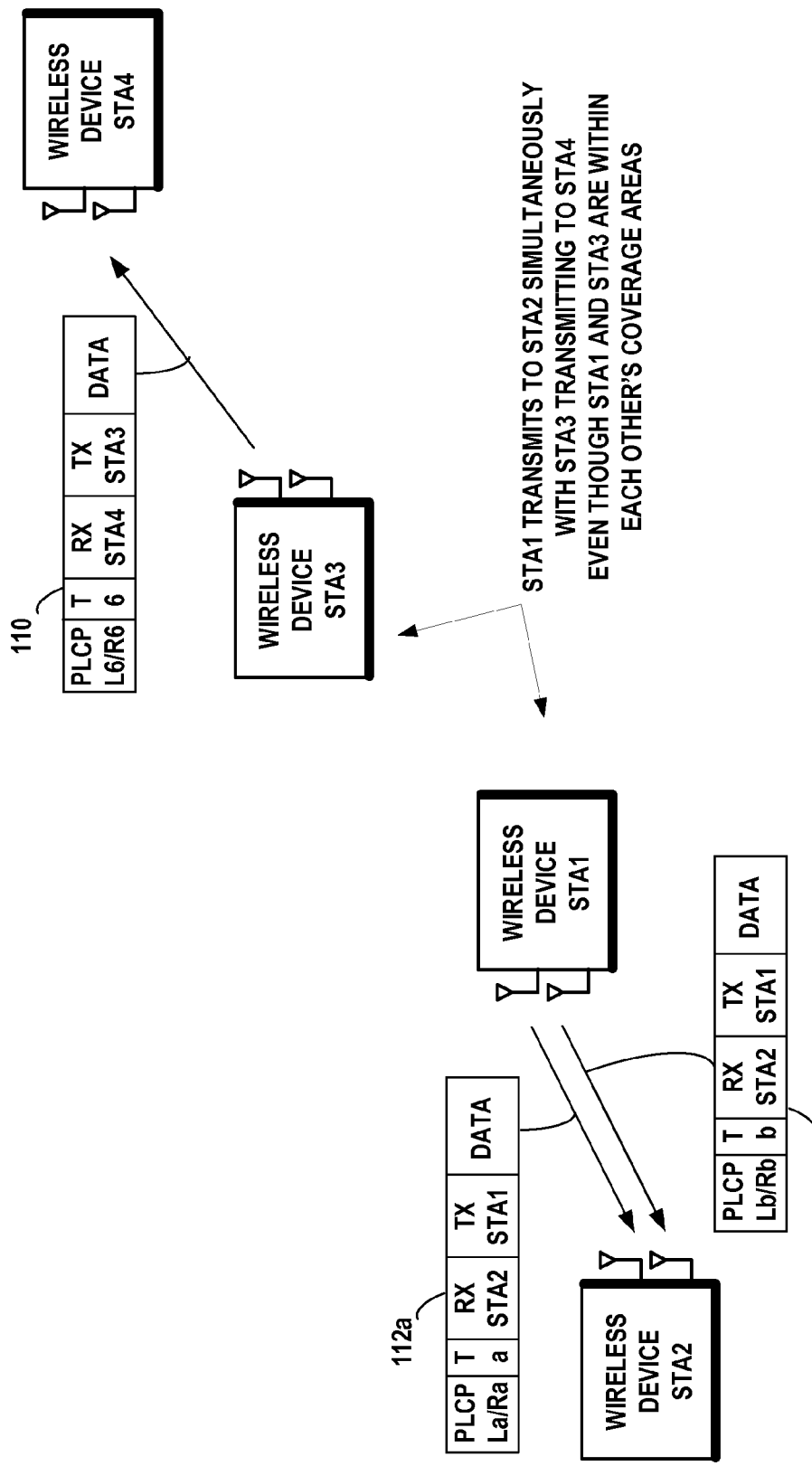
FIG. 1J shows the example wireless network diagram of FIG. 1I, wherein STA1 may simultaneously send multiple packets to STA2 within an overall duration less than or equal to duration of the packet received from STA3.
Figure 1J:
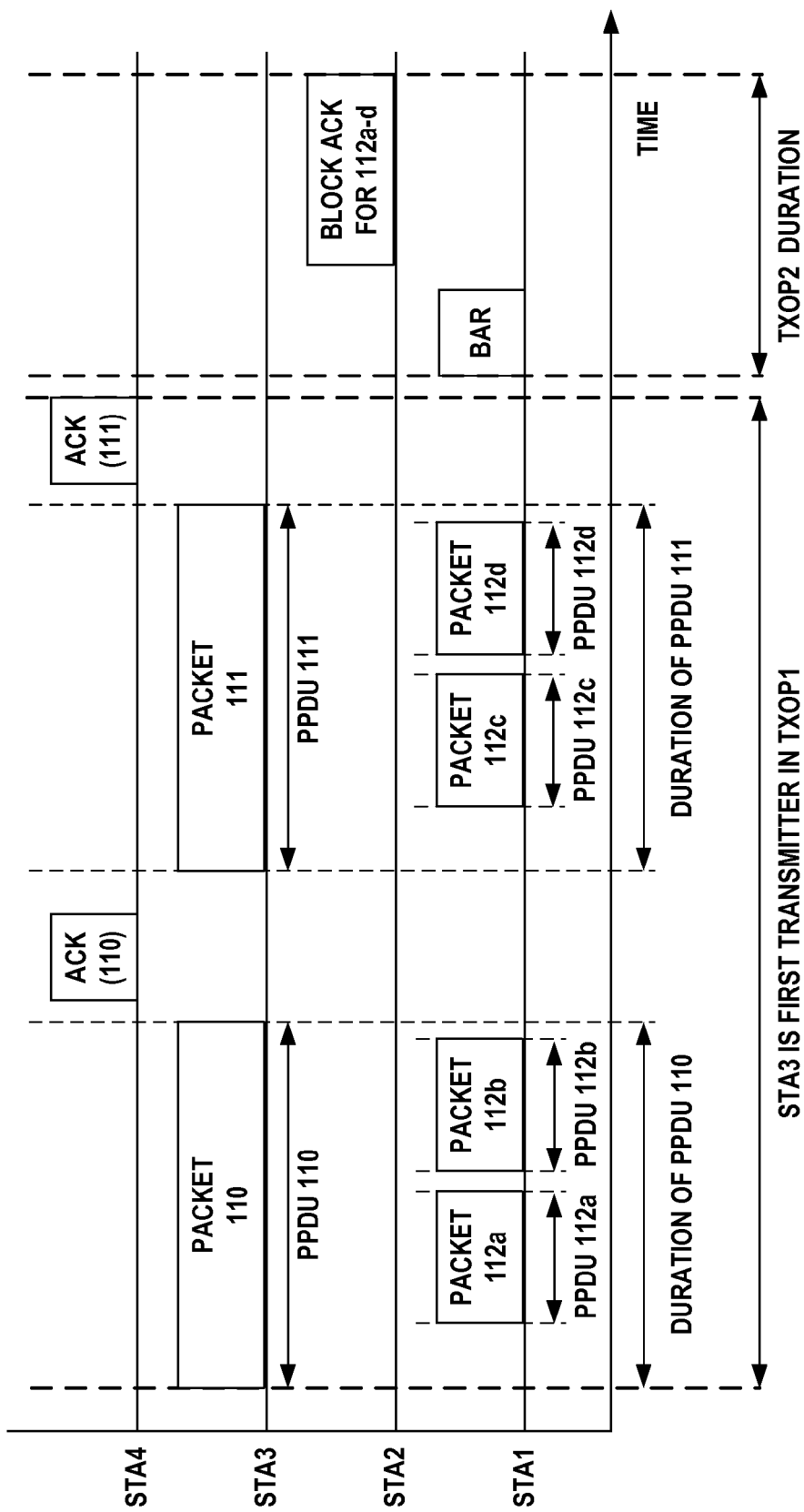

FIG. 1J shows the example wireless network diagram of FIG. 1I according to an embodiment of the present invention, wherein STA1 may simultaneously send multiple packets 112a and 112b to STA2 within an overall duration less than or equal to duration of the PPDU of the packet 110 received from STA3.

FIG. 1Ja is an example timing diagram illustrating the operation of the wireless devices in FIG. 1J according to an embodiment of the present invention. STA3 is the first transmitter in the TXOP1. STA1 may simultaneously send multiple packets 112a and 112b to STA2 within an overall duration less than or equal to duration of the PPDU 110 of the packet 110 received from STA3. ACK(110) is an acknowledgement to PPDU 110. STA1 may simultaneously send a second set of multiple packets 112c and 112d to STA2 within an overall duration less than or equal to duration of the PPDU 111 of the second packet 111 received from STA3. ACK(111) is an acknowledgement to PPDU 111. In the following interval TXOP2, STA1 may transmit to STA2 a Block ACK request (BAR) frame for a delayed block acknowledgement from STA2 for the four packets 112a-d.

Even though the example shows transmission of two packets, the maximum amount of packets is only limited by the duration of the PPDU of the packet 110 received from STA3. At minimum the consecutive packets have a SIFS or RIFS interval between the transmitted packets. RIFS interval may used only if it is supported by both devices in the PAIR. The transmitted packets may be aggregated and apply any combination of A-MSDU and A-MPDU aggregations. The transmitted packets may be transmitted with any access code (AC), but it is recommended to transmit first packets from the highest AC that has buffered traffic. The simultaneously transmissions may be applied to retransmit packets. An acknowledgement may be delayed with a delayed block acknowledgement in which the Block ACK request (BAR) frame is transmitted from STA1 to STA2.

FIG. 1Jb is an example timing diagram illustrating multiple TXOPs may occur during the same lifetime duration defined by simultaneous transmissions request 107 according to an embodiment of the present invention. STA3 is first to transmit packet 110a to its paired device STA4 and thus owns the TXOP, during which STA1 simultaneously transmits packets 112a and 112b to STA2. ACKa(110a) is an acknowledgement to PPDU 110a. After the expiration of the TXOP, ACKa (112a) is an acknowledgement to PPDU 112a and ACKb (112b) is an acknowledgement to PPDU 112b. STA1 is first to transmit packet 112c to its paired device STA2 and thus owns the second TXOP, during which STA3 simultaneously transmits packet 110b to STA4. ACKc(112c) is an acknowledgement to PPDU 112c. After the expiration of the second TXOP, ACKb(110b) is an acknowledgement to PPDU 110b. The LIFETIME duration of the simultaneous transmissions mode is defined by the simultaneous transmissions request 107.

Figure 1K:
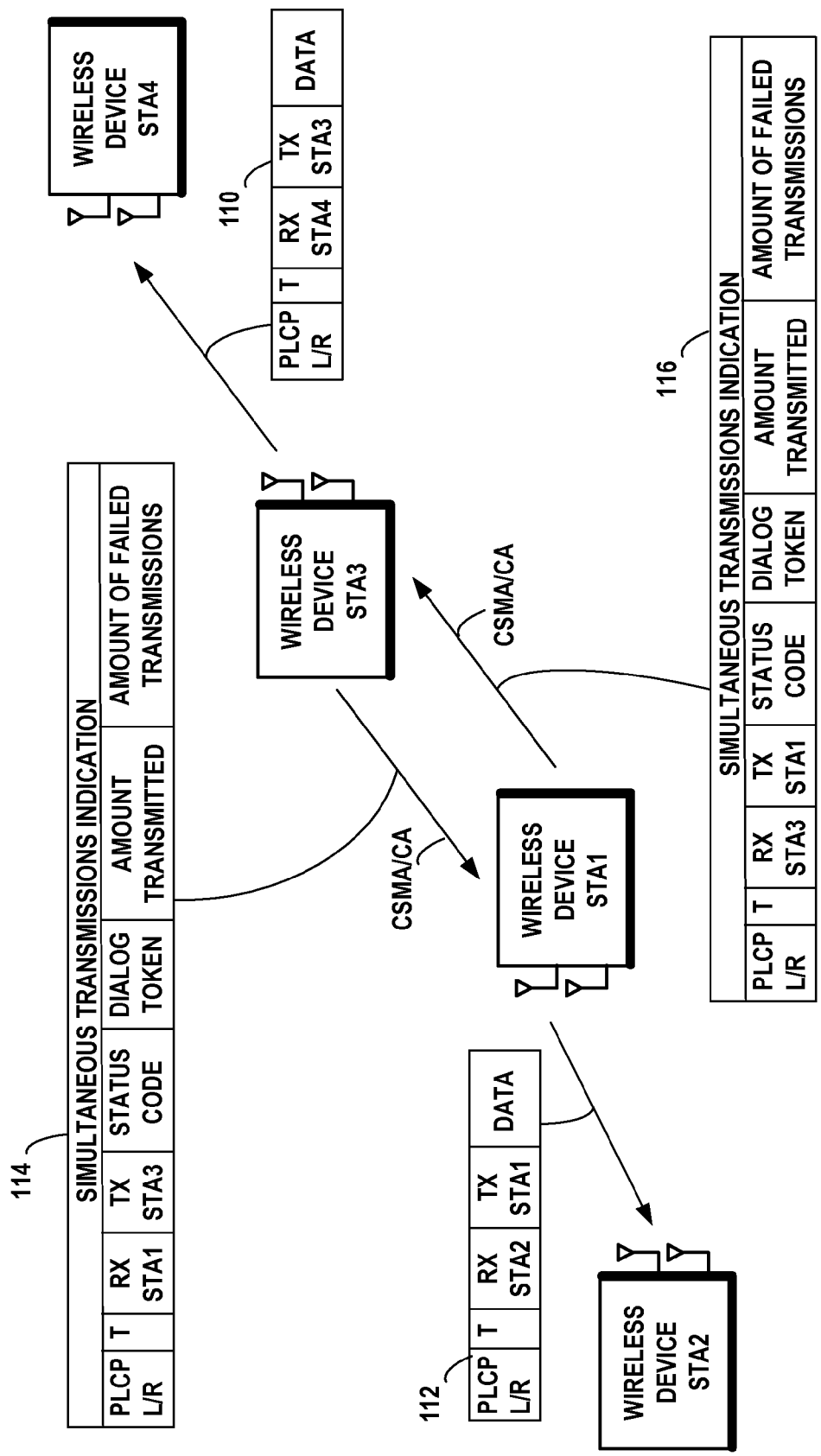
FIG. 1K shows the example wireless network diagram of FIG. 1J, wherein STA1 exchanges with STA3 simultaneous transmissions indications that indicate successful and failed transmissions from the first device STA1 to the second device STA2 and from the third device STA3 to the fourth device STA4 according to an embodiment of the present invention.
Figure 1K:
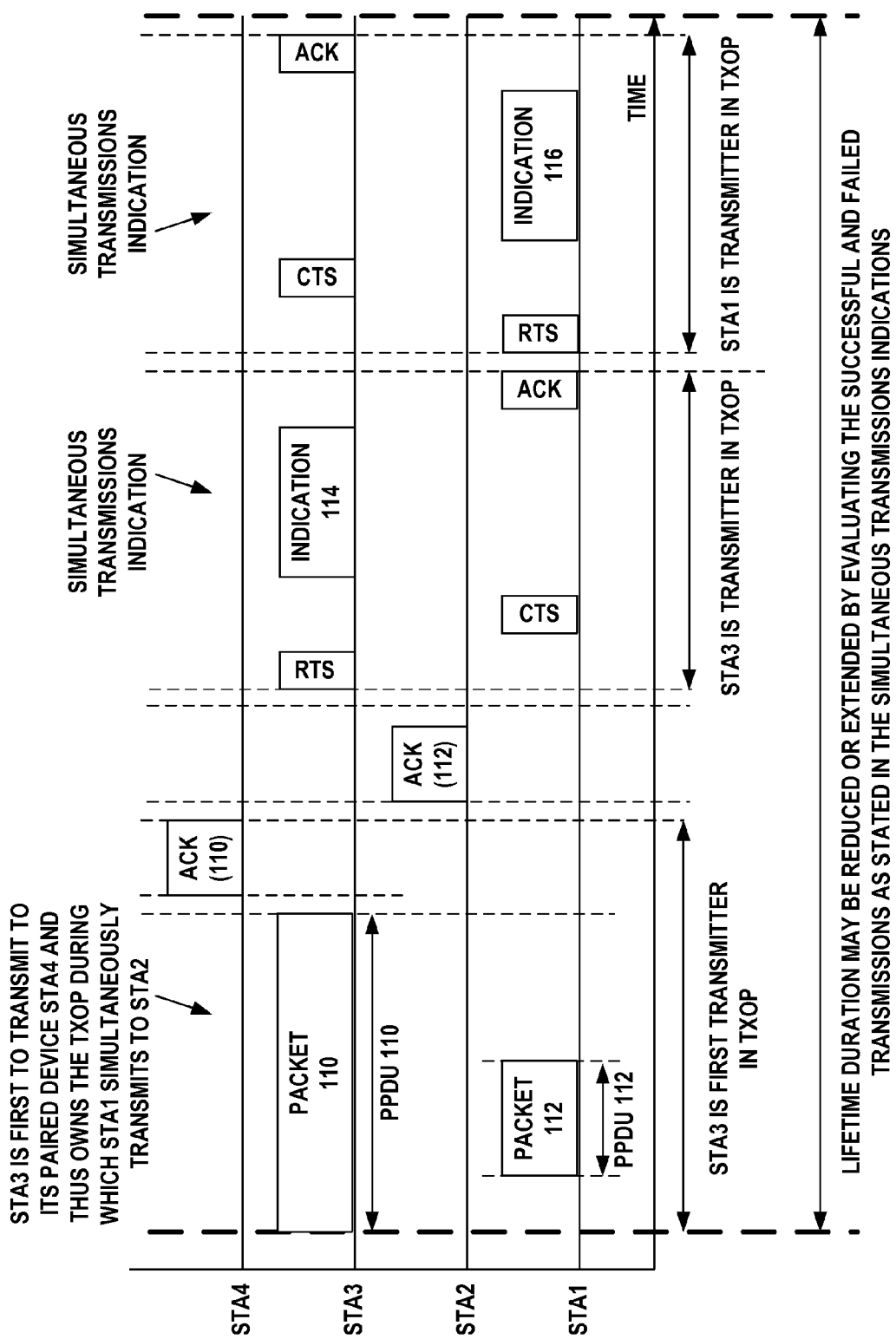

FIG. 1K shows the example wireless network diagram of FIG. 1J according to an embodiment of the present invention, wherein STA1 exchanges with STA3 simultaneous transmissions indications 114 and 116 that indicate successful and failed transmissions from the first device STA1 to the second device STA2 and from the third device STA3 to the fourth device STA4.

FIG. 1Ka is an example timing diagram illustrating the operation of the wireless devices in FIG. 1K according to an embodiment of the present invention. STA3 is first to transmit packet 110 to its paired device STA4 and thus owns the TXOP during which STA1 simultaneously transmits packet 112 to STA2. After the expiration of the of the PPDU 110 of the packet 110 received from STA3, STA4 sends its ACK(110). A new TXOP is obtained to enable STA2 to send its ACK(112) to STA1. The information on successful and failed transmissions between STA3 and STA4 is summarized in simultaneous transmissions indication 114 and sent by STA3 to STA1 using the CSMA/CA access method. The information on successful and failed transmissions between STA1 and STA2 is summarized in simultaneous transmissions indication 116 and sent by STA1 to STA3 using the CSMA/CA access method. The LIFETIME duration of the simultaneous transmissions mode may be reduced or extended by evaluating the successful and failed transmissions as stated in the simultaneous transmissions indications. The termination of the paired arrangement of a device pair may also be carried out, for example where there is excessive interference or transmission failures experienced by one or both devices in the pair, or if the link between devices in a pair is poor or lost.

SimultaneousTransmissions.indication

If either of the transmitters desires to terminate the simultaneous transmissions, it may transmit SimultaneousTransmissions.indication with status code indicates failure.

The SimultaneousTransmissions.indication frame is transmitted to maintain the established simultaneous transmission possibility active. The simultaneousTransmissions.indication is transmitted to individual address and it is transmitted to the transmitter of the simultaneous transmissions. The SimultaneousTransmissions.indication content is shown in Table 4.

TABLE 4

Content of the SimultaneousTransmissions.indication frame

| Octets: 1 | 1 | 2 | 2 |
|---|---|---|---|
| Status Code | Dialog Token | Amount of transmitted MSDUs and MMPDUs during the simultaneous opportunities | Amount of failed transmissions during the simultaneous opportunities |

The Status Code field is one octet in length and indicates the continuation of the parallel transmission mode. The values and their explanations of the status code are shown in table 3. If the Status Code is set to failure, the simultaneous transmission mode is discarded or eliminated.

The Dialog Token field is one octet field and it is set to the same value as in request and response frame for the simultaneous transmission mode. The dialog Token field is used for matching indication to the simultaneous transmission mode.

The Amount of transmitted MSDUs and MMPDUs during the simultaneous opportunities field is two octets in length and contains the amount of MSDUs and MMPDUs that are transmitted since the transmission of previous SimultaneousTransmissions.indication frame.

The Amount of failed transmissions during the simultaneous opportunities field is two octets in length and contains the amount of failed transmission attempts since the last simultaneous transmission attempt.

Figure 1L:
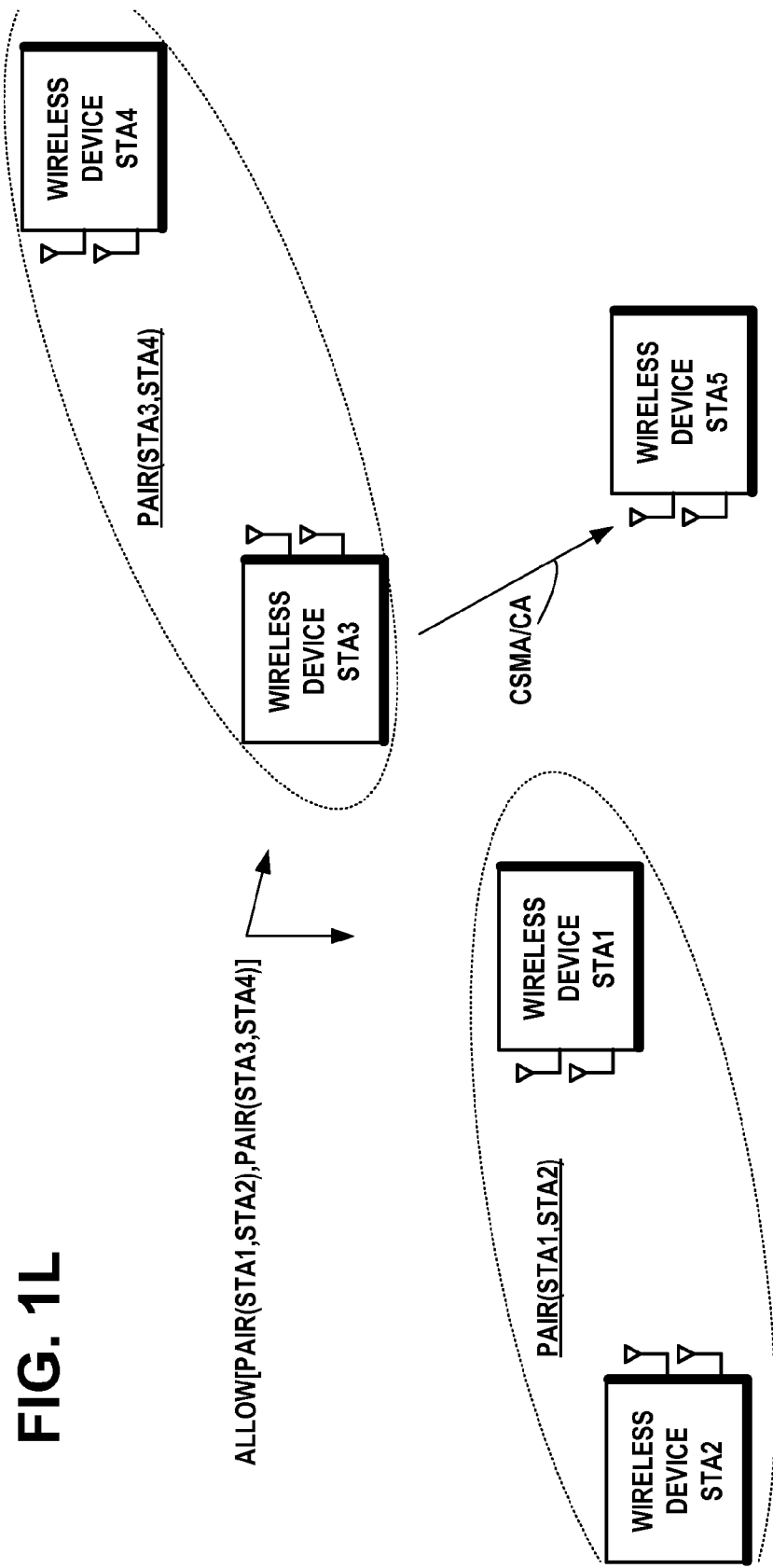
FIG. 1L shows the example wireless network diagram of FIG. 1J, wherein STA3 is the first transmitter in the TXOP and is free to transmit both CSMA/CA packets to a fifth device STA5 as well as simultaneously (with the first pair STA1, STA2) send multiple packets to its paired device STA4 within an overall duration less than or equal to the TXOP duration of STA3 according to an embodiment of the present invention.
Figure 1L:
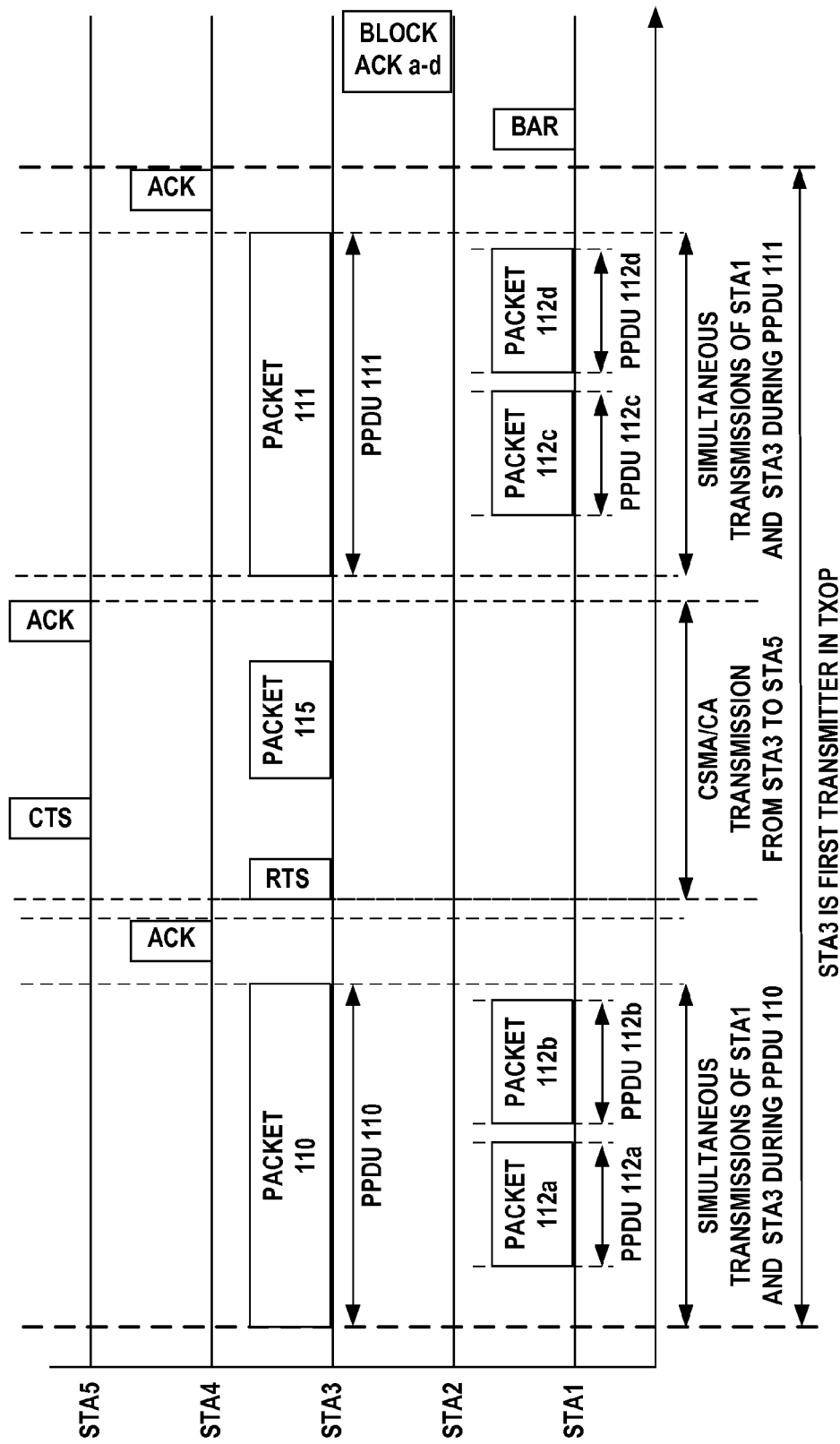

FIG. 1L shows the example wireless network diagram of FIG. 1J according to an embodiment of the present invention, wherein STA3 is the first transmitter in the TXOP and is free to transmit both CSMA/CA packets to a fifth device STA5 as well as simultaneously (with the first pair STA1,STA2) send multiple packets to its paired device STA4 within an overall duration less than or equal to the TXOP duration of STA3.

FIG. 1La is an example timing diagram illustrating the operation of the wireless devices in FIG. 1L according to an embodiment of the present invention. STA3 is the first transmitter in the TXOP and transmits the packet 110 to its paired device STA4. STA1 may simultaneously send to its paired device STA2 multiple packets 112a and 112b within an overall duration less than or equal to duration of the PPDU of the packet 110 received from STA3. Then, STA3 may transmit packet 115 using the CSMA/CA access method to a fifth device STA5, sending RTS to STA5, receiving a CTS, sending packet 115, and receiving an ACK from STA5. Optionally, the STA3 may transmit packet 115 without RTS CTS signaling prior the packet transmission. Then, STA3 may transmit a second packet 111 to its paired device STA4. STA1 may simultaneously send to its paired device STA2 a second set of multiple packets 112c and 112d to STA2 within an overall duration less than or equal to duration of the PPDU of the packet 111 received from STA3. After the end of the TXOP, STA1 may transmit to its paired device STA2 a Block ACK request (BAR) frame for a delayed block acknowledgement from STA2 for the four packets 112a-d.

Figure 2:
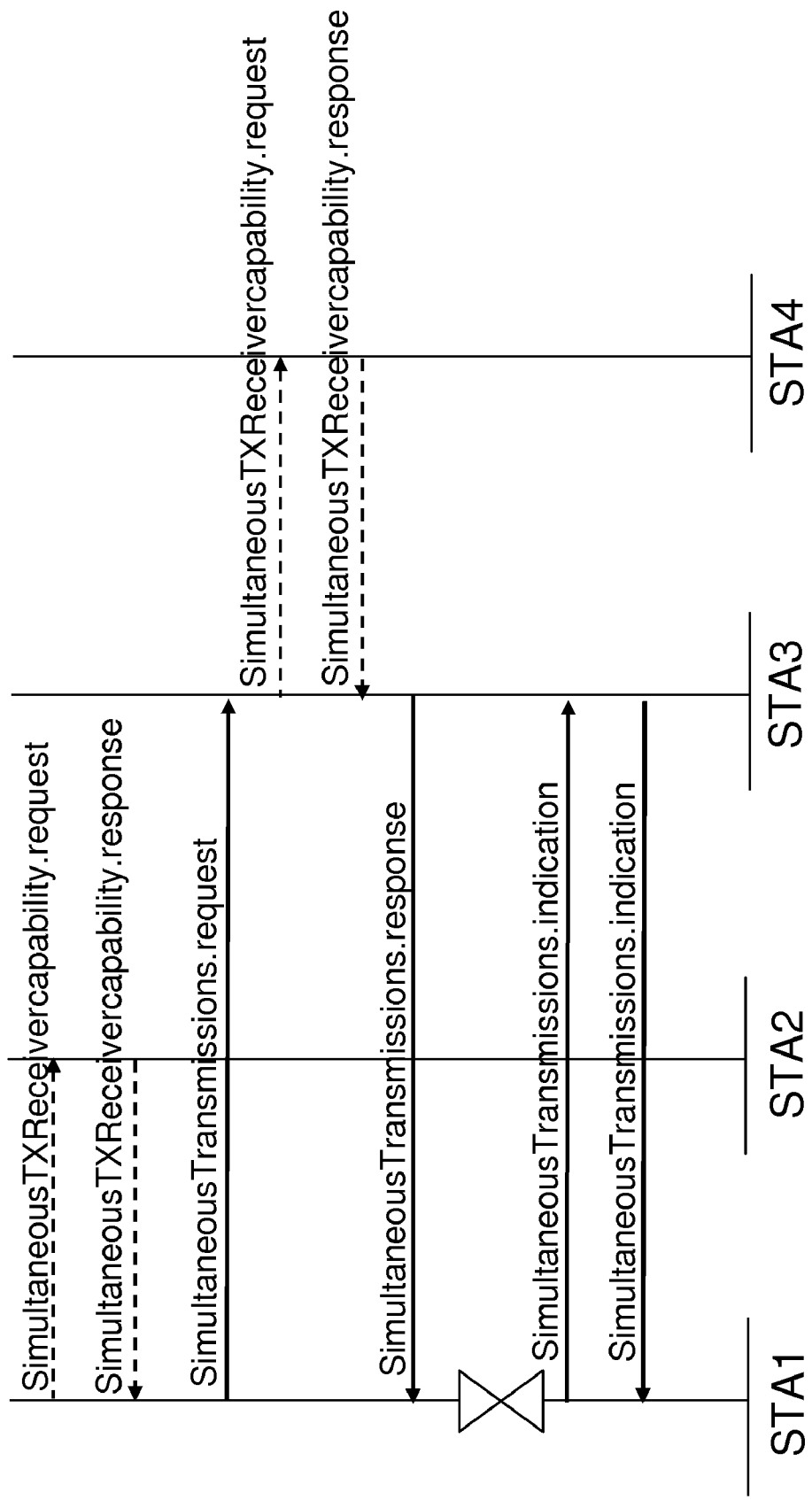
FIG. 2 is an example sequence diagram of the simultaneous transmit/receive capability request and response, the simultaneous transmissions request and response, and the simultaneous transmissions indication of FIGS. 1A to 1L according to an embodiment of the present invention.

FIG. 2 is an example sequence diagram of the simultaneous transmit/receive capability request and response according to an embodiment of the present invention, the simultaneous transmissions request and response, and the simultaneous transmissions indication of FIGS. 1A to 1L.

Figure 3:
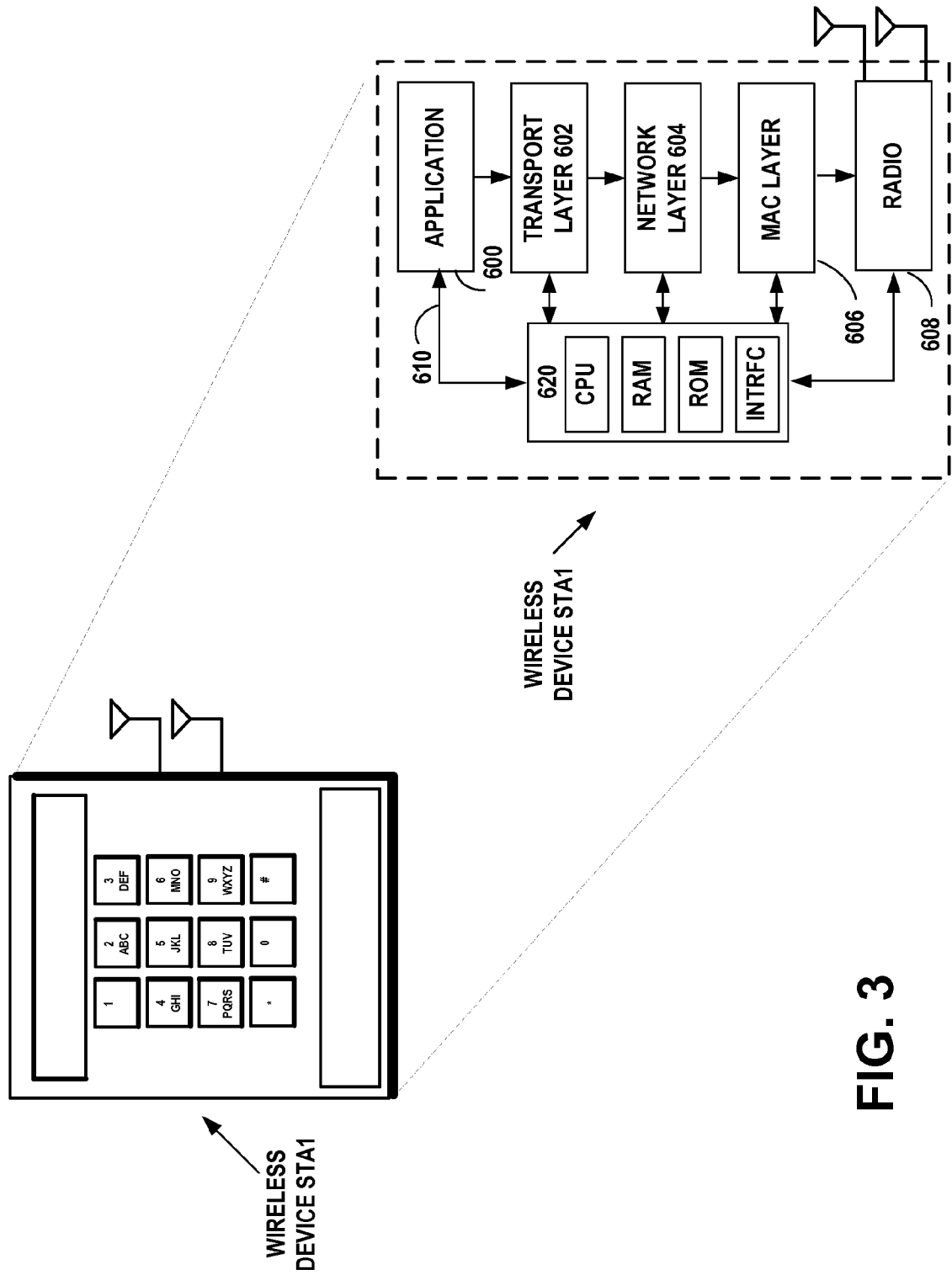
FIG. 3 illustrates an external view and a functional block diagram of an example embodiment of any one of the four stations or wireless devices of FIGS. 1A to 1L.

FIG. 3 illustrates an external view and a functional block diagram of an example embodiment of any one of the wireless devices STA1, STA2, STA3, and STA4, shown in FIG. 1A. For example, the wireless device STA1 may be a communications device, PDA, cell phone, laptop or palmtop computer, or the like. The wireless device STA1 includes a processor 620, which includes a central processing unit (CPU), a random access memory (RAM), a read only memory (ROM), and interface circuits to interface with one or more radio transceivers 608, battery and other power sources, key pad, touch screen, display, microphone, speakers, ear pieces, camera or other imaging devices, etc. in the devices STA1, STA2, STA3, and STA4. The RAM and ROM can be removable memory devices such as smart cards, SIMs, WIMs, semiconductor memories such as RAM, ROM, PROMS, flash memory devices, etc. The wireless device STA1 includes for example a protocol stack that includes the user's application program 600 at the top, the Transmission Control Protocol (TCP) transport layer 602, and the network layer 604, the Media Access Control (MAC) layer 606, and one or more radio transceivers in the physical layer 608 at the bottom of the protocol stack. The MAC layer provides functionality to allow reliable data delivery for the upper layers over the wireless medium.

The processor 620, protocol stack layers 602, 604, 606, and/or application program 600 may be embodied as program logic stored in the RAM and/or ROM in the form of sequences of programmed instructions which, when executed in the CPU, carry out the functions of the disclosed embodiments. The program logic can be delivered to the writeable RAM, PROMS, flash memory devices, etc. of the wireless device STA1 from a computer program product or article of manufacture in the form of computer-usable media such as resident memory devices, smart cards or other removable memory devices, or in the form of program logic transmitted over any transmitting medium which transmits such a program. Alternately, they can be embodied as integrated circuit logic in the form of programmed logic arrays or custom designed application specific integrated circuits (ASIC). The one or more radios 608 in the wireless device STA1 may be separate transceiver circuits or alternately, the one or more radios 608 may be a single RF module capable of handling one or multiple channels in a high speed, time and frequency multiplexed manner in response to the processor 620.

FIG. 4 illustrates a flow diagram 400 of an example embodiment of the example signaling method. The steps of the flow diagram represent computer code instructions stored in the RAM and/or ROM memory of the wireless device STA1, which when executed by the central processing units (CPU), carry out the functions of the example embodiments of the invention. The steps may be carried out in another order than shown and individual steps may be combined or separated into component steps. The steps of the example method 400 are as follows.

Step 402: monitoring by a first wireless device, second and third devices and competing for transmission resources.

Step 404: forming by the first device, a first device pair with the second wireless device in the first device's coverage area and channel.

Step 406: detecting by the first device, a second device pair of the third device in the first device's coverage area and channel, the third device paired with a fourth device that has poor link performance with the first device or is out of range of the first device.

Step 408: transmitting by the first device, a simultaneous transmissions request to the third device;

Step 410: receiving by the first device, a simultaneous transmissions response from the third device, indicating that the third device has formed the second pair with the fourth device.

Step 412: storing by the first device, an allowed pairs information including identities of the devices in the first pair and the devices in the second pair;

Step 414: receiving by the first device, a first wireless message from the third device, including the identities of the devices in the second pair and a duration value for the first message, the first message having been transmitted during a transmit opportunity from the third device to the fourth device;

Step 416: calculating by the first device, in response to the first message, a duration of a second wireless message to be transmitted by the first device to the second device substantially simultaneously with the first message, the calculated duration being such as to prevent the second message from terminating later than the termination of the first message;

Step 418: transmitting by the first device to the second device the second wireless message substantially simultaneously with the first wireless message.

FIG. 5 is an example flow diagram 450 of operational steps of an example embodiment of the signaling method in exchanging simultaneous transmissions indications of FIG. 1K. The steps of the flow diagram represent computer code instructions stored in the RAM and/or ROM memory of the wireless device STA1, which when executed by the central processing units (CPU), carry out the functions of the example embodiments of the invention. The steps may be carried out in another order than shown and individual steps may be combined or separated into component steps. The steps of the example method 450 are as follows.

Steps 402 to 418 of the flow diagram of FIG. 4, wherein the first device is transmitting to the second device simultaneously with the third device transmitting to the fourth device.

Step 452: transmitting by the first device, a first simultaneous transmissions indication to the third device, indicating successful and failed transmissions from the first device to the second device Step 456: receiving by the first device, a second simultaneous transmissions indication from the third device, indicating successful and failed transmissions from the third device to the fourth device Step 458: determining by the first device from the first and second simultaneous transmission indications, whether to continue the simultaneous transmissions.

Example embodiments of the invention include a signaling method that comprises the following steps:

detecting by a first wireless device STA1 in a wireless medium, that it is frequently delayed in beginning transmissions to a second wireless device STA2, because a third wireless device STA3 is a frequent user of the medium;

determining by the first device STA1 from addresses in packets received from the third device STA3 that the third device STA3 is transmitting its packets to a fourth device STA4 whose reply transmissions are not received by the first device or that link performance is poor with the fourth device STA4;

transmitting by the first device STA1, a query to the second device STA2 asking whether the second device STA2 receives the packets transmitted by the third device STA3;

recognizing by the first device STA1 that a simultaneous transmissions mode may be possible with the third device STA3, if the second device STA2 does not receive packets transmitted by the third device STA3 or the link performance is poor with the third device STA3;

establishing by the first device STA1, a first device pair arrangement with the second device STA2 by determining that the second device STA2 has a capability to participate as a receiver device with the first device being a transmitter device in the first device pair, in a simultaneous transmissions mode;

transmitting by the first device STA1, a request to the third device STA3 to set up a simultaneous transmissions mode between the first device pair and a second device STA2 pair of the third device STA3 as a transmitter and the fourth device STA4 as a receiver;

establishing by the first device STA1, the simultaneous transmissions mode between the first device pair and the second device STA2 pair;

receiving by the first device STA1a first packet from the third device STA3, the first packet containing the addresses of the third device STA3 and the fourth device STA4;

calculating by the first device STA1, a first duration of the first packet from length L and data rate R values in its physical layer conversion procedure (PCLP) header;

preparing by the first device STA1, a second packet to be substantially simultaneously transmitted by the first device to the second device STA2, with a second duration that fits within the first duration of the first packet sent from the third device STA3 to the fourth device STA4; and transmitting by the first device STA1, the second packet to the second device STA2, substantially simultaneously with the first packet sent from the third device STA3 to the fourth device STA4.

Example embodiments of the invention include a signaling method that further comprises the step of preparing by the first device STA1, the MAC protocol data unit (MPDU) of the second packet to include a delay duration value T to cause the second device STA2 to delay transmitting any packet until after completion of transmission of the first packet by the third device STA3, during which the first device STA1 has transmitted the second packet.

FIG. 6 is an example flow diagram 480 of operational steps of an example embodiment of the signaling method carried out between the first, second, third, and fourth devices of FIGS. 1A to 1L. The steps of the flow diagram represent computer code instructions stored in the RAM and/or ROM memory of the wireless device STA1, which when executed by the central processing units (CPU), carry out the functions of the example embodiments of the invention. The steps may be carried out in another order than shown and individual steps may be combined or separated into component steps. The example embodiment of the signaling method comprises the following steps:

Step 482: participating by a first device in establishment of a first device pair with a second device;

Step 484: participating by the first device in establishment of a simultaneous transmissions mode between the first device pair, and a second device pair including a third and fourth wireless devices;

Step 486: wirelessly receiving by the first device at least a portion of a first packet from the third device that was transmitted by the third device and destined for the fourth device, the at least portion of the first packet containing a length value and a wireless transmission rate value for the first packet;

Step 488: calculating by the first wireless device, a first duration for the first packet based on the length and transmission rate values;

Step 490: generating by the first wireless device, a second packet to be substantially simultaneously transmitted by the first wireless device and destined for the second wireless device, with a second duration that fits within the first duration of the first packet; and Step 492: wirelessly transmitting by the first wireless device, the second packet destined for the second device, substantially simultaneously with transmission of the first packet from the third device destined for the fourth device.

Example embodiments of the invention include a signaling apparatus that comprises the following elements:

A means for participating by a first device in establishment of a first device pair with a second device;

A means for participating by the first device in establishment of a simultaneous transmissions mode between the first device pair, and a second device pair including a third and fourth devices;

A means for wirelessly receiving by the first device at least a portion of a first packet from the third device that was transmitted by the third device and destined for the fourth device, the at least portion of the first packet containing a length value and a wireless transmission rate value for the first packet;

A means for calculating by the first device, a first duration for the first packet based on the length and transmission rate values;

A means for generating by the first device, a second packet to be substantially simultaneously transmitted by the first device and destined for the second device, with a second duration that fits within the first duration of the first packet; and A means for wirelessly transmitting by the first device, the second packet destined for the second device, substantially simultaneously with transmission of the first packet from the third device destined for the fourth device.

The resulting embodiments of the invention allow two devices in the same channel and in the same coverage to transmit at the same time and provide better system throughput for WLAN systems. This transmission mechanism may be useful in a home environment, where static devices transmit packets to each other. For instance, the video transmissions in a mesh BSS or in infrastructure BSS with tunneled direct link in the IEEE 802.11z protocol, may be good match for the embodiments.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    participating by a first device in establishment of a first device pair with a second device;
    participating by the first device in establishment of a simultaneous transmissions mode between the first device pair, and a second device pair including a third and fourth devices;
    wirelessly receiving by the first device a portion of a first packet from the third device that was transmitted by the third device and destined for the fourth device, the portion of the first packet containing a length value and a wireless transmission rate value for the first packet;
    calculating by the first device, a remaining duration for the first packet based on the length and transmission rate values;
    generating by the first device, a second packet to be transmitted by the first device and destined for the second device, having a duration that fits within and is less than or equal to the calculated remaining duration of the first packet; and
    wirelessly transmitting by the first device, the second packet destined for the second device to fit within the calculated remaining duration of the first packet.

2. The method of claim 1, said establishing step further comprising:
    detecting by the first device in a wireless medium, that it is occasionally delayed in beginning transmissions to the second device, because the third device is an occasional user of the wireless medium;
    determining by the first device from addresses in packets received from the third device that the third device is transmitting its packets destined for the fourth device and a criterion that the second device does not receive packets transmitted by the third device or the link performance is poor between the second device and the third device;
    establishing by the first device, the first device pair with the second device by determining that the second device has a capability to participate as a receiver device with the first device being a transmitter device in the first device pair, in the simultaneous transmissions mode; and
    transmitting by the first device, a request to the third device to set up the simultaneous transmissions mode between the first device pair and a second device pair of the third device as a transmitter and the fourth device as a receiver, if the criterion is satisfied.

3. The method of claim 2, further comprising:
    generating by the first device, the second packet to include a delay duration value to cause the second device to delay transmitting any packet until after the calculated remaining duration of the first packet has elapsed.

4. The method of claim 1, said establishing step further comprising:
    forming by the first device, the first device pair with the second device in a coverage area and channel of the first device;
    detecting by the first device, the second device pair including the third device in the first device's coverage area and channel, the third device paired with the fourth device;
    transmitting by the first device, a simultaneous transmissions request to the third device, if the second device does not receive packets transmitted by the third device or the link performance is poor between the second device and the third device; and
    receiving by the first device, a simultaneous transmissions response from the third device, indicating that the third device has formed the second pair with the fourth device.

5. The method of claim 4, further comprising;
    monitoring by the first device, the second device using a carrier sense multiple access with collision avoidance access method, prior to forming the first device pair with the second device; and
    transmitting by the first device, a second wireless message destined for the second device during the transmission of the first wireless message from the third device destined for the fourth device, the second wireless message indicating a duration during which no messages are received from the second device after forming the first device pair with the second device.

6. The method of claim 4, further comprising;
    monitoring by the first device, the second device and the third device and competing for transmission resources using a carrier sense multiple access with collision avoidance access method, prior to forming the first device pair with the second device; and
    transmitting by the first device a second wireless message destined for the second device, the second wireless message indicating a duration during which no messages are received from the second device, after receiving by the first device, a first wireless message from the third device.

7. The method of claim 4, further comprising;
    storing by the first device, an allowed pairs information including identities of the devices in the first pair and the devices in the second pair, following receiving the simultaneous transmissions response from the third device.

8. The method of claim 4, further comprising:
    transmitting by the first device, a first simultaneous transmissions indication to the third device, indicating successful transmissions from the first device to the second device;
    receiving by the first device, a second simultaneous transmissions indication from the third device, indicating successful transmissions from the third device to the fourth device; and
    determining by the first device from the first and second simultaneous transmission indications, whether to continue the simultaneous transmissions mode.

9. The method of claim 4, further comprising:
    transmitting by the first device, the second wireless message during the transmission by the third device of the first message formed as a physical layer convergence procedure (PLCP) protocol data unit (PPDU), without receiving any messages from the second device during a duration indicated in the first wireless message of the third device, to reuse transmission resources in a coverage area of the third device.

10. The method of claim 4, further comprising:
    monitoring by the first device, the second device and competing for transmission resources, using a carrier sense multiple access with collision avoidance access method, prior to forming the first device pair with the second device; and transmitting by the first device, the second wireless message destined for the second device without receiving any messages from the second device during a duration indicated in the second wireless message, after forming the first device pair with the second device;

wherein the third device and the fourth device initially compete for transmission resources using the carrier sense multiple access with collision avoidance access method, prior to forming the second device pair and subsequently the third device transmits the first wireless message destined for the fourth device, after forming the second device pair with the fourth device.

11. The method of claim 4, further comprising:
monitoring by the first device, the third device;
detecting by the first device, the third device using excessive transmission resources in the operating channel of the first device; and
transmitting by the first device, the simultaneous transmissions request to the third device to enable simultaneous transmissions with the third device.

12. The method of claim 4, further comprising:
inferring from a receipt by the first device of a simultaneous transmissions response from the third device, that the third device has verified that simultaneous transmissions to the fourth device are possible to perform.

13. A device, comprising:
at least one processor;
at least one memory including computer program code;
the at least one memory and the computer program code configured to, with the at least one processor, cause the device at least to:
participate by the device, which is a first device, in establishment of a first device pair with a second device;
participate by the first device in establishment of a simultaneous transmissions mode between the first device pair, and a second device pair including a third and fourth devices;
wirelessly receive by the first device a portion of a first packet from the third device that was transmitted by the third device and destined for the fourth device, the portion of the first packet containing a length value and a wireless transmission rate value for the first packet;
calculate by the first device, a remaining duration for the first packet based on the length and transmission rate values;
generate by the first device, a second packet to be transmitted by the first device and destined for the second device, having a duration that fits within and is less than or equal to the calculated remaining duration of the first packet; and
wirelessly transmit by the first device, the second packet destined for the second device, to fit within the calculated remaining duration of the first packet.

14. The device of claim 13, further comprising:
the at least one memory and the computer program code configured to, with the at least one processor, cause the device at least to:
detect by the first device in a wireless medium, that it is occasionally delayed in beginning transmissions to the second device, because the third device is an occasional user of the medium;
determine by the first device from addresses in packets received from the third device that the third device is transmitting its packets destined for the fourth device and a criterion that the second device does not receive packets transmitted by the third device or the link performance is poor between the second device and the third device;
establish by the first device, the first device pair with the second device by determining that the second device has a capability to participate as a receiver device with the first device being a transmitter device in the first device pair, in the simultaneous transmissions mode; and
transmit by the first device, a request to the third device to set up the simultaneous transmissions mode between the first device pair and a second device pair of the third device as a transmitter and the fourth device as a receiver.

15. The device of claim 14, further comprising:
the at least one memory and the computer program code configured to, with the at least one processor, cause the device at least to:
generate by the first device, the second packet to include a delay duration value to cause the second device to delay transmitting any packet until after the calculated remaining duration of the first packet has elapsed.

16. The device of claim 13, said establishing step further comprising:
the at least one memory and the computer program code configured to, with the at least one processor, cause the device at least to:
form by the first device, the first device pair with the second device in a coverage area and channel of the first device;
detect by the first device, the second device pair including the third device in the first device's coverage area and channel, the third device paired with the fourth device;
transmit by the first device, a simultaneous transmissions request to the third device, if the second device does not receive packets transmitted by the third device or the link performance is poor between the second device and the third device; and
receive by the first device, a simultaneous transmissions response from the third device, indicating that the third device has formed the second pair with the fourth device.

17. The device of claim 16, further comprising;
the at least one memory and the computer program code configured to, with the at least one processor, cause the device at least to:
monitor by the first device, the second device using a carrier sense multiple access with collision avoidance access method, prior to forming the first device pair with the second device; and
transmit by the first device, a second wireless message destined for the second device during the transmission of the first wireless message from the third device destined for the fourth device, the second wireless message indicating a duration during which no messages are received from the second device after forming the first device pair with the second device.

18. The device of claim 16, further comprising:
the at least one memory and the computer program code configured to, with the at least one processor, cause the device at least to:
monitor by the first device, the second device and the third device and compete for transmission resources using a carrier sense multiple access with collision avoidance access method, prior to forming the first device pair with the second device; and
transmit by the first device a second wireless message destined for the second device, the second wireless message indicating a duration during which no messages are received from the second device, after receiving by the first device, a first wireless message from the third device.

19. The device of claim 16, further comprising:
the at least one memory and the computer program code configured to, with the at least one processor, cause the device at least to:
store by the first device, an allowed pairs information including identities of the devices in the first pair and the devices in the second pair, following receiving the simultaneous transmissions response from the third device.

20. The device of claim 16, further comprising:
the at least one memory and the computer program code configured to, with the at least one processor, cause the device at least to:
transmit by the first device, a first simultaneous transmissions indication to the third device, indicating successful transmissions from the first device to the second device;
receive by the first device, a second simultaneous transmissions indication from the third device, indicating successful transmissions from the third device to the fourth device; and
determine by the first device from the first and second simultaneous transmission indications, whether to continue the simultaneous transmissions mode.

21. The device of claim 16, further comprising:
the at least one memory and the computer program code configured to, with the at least one processor, cause the device at least to:
transmit by the first device, the second wireless message during the transmission by the third device of the first message formed as a physical layer convergence procedure (PLCP) protocol data unit (PPDU), without receiving any messages from the second device during a duration indicated in the first wireless message of the third device, to reuse transmission resources in a coverage area of the third device.

22. The device of claim 16, further comprising:
the at least one memory and the computer program code configured to, with the at least one processor, cause the device at least to:
monitor by the first device, the second device and compete for transmission resources, using a carrier sense multiple access with collision avoidance access method, prior to forming the first device pair with the second device; and
transmit by the first device, the second wireless message destined for the second device without receiving any messages from the second device during a duration indicated in the second wireless message, after forming the first device pair with the second device;

wherein the third device and the fourth device initially compete for transmission resources using the carrier sense multiple access with collision avoidance access method, prior to forming the second device pair and subsequently the third device transmits the first wireless message destined for the fourth device, after forming the second device pair with the fourth device.

23. The device of claim 16, further comprising:
the at least one memory and the computer program code configured to, with the at least one processor, cause the device at least to:
monitor by the first device, the third device;
detect by the first device, the third device using excessive transmission resources in the operating channel of the first device; and
transmit by the first device, the simultaneous transmissions request to the third device to enable simultaneous transmissions with the third device.

24. The device of claim 16, further comprising:
the at least one memory and the computer program code configured to, with the at least one processor, cause the device at least to:
infer from a receipt by the first device of a simultaneous transmissions response from the third device, that the third device has verified that simultaneous transmissions to the fourth device are possible to perform.

25. A computer readable non-transitory medium storing program instructions, which when executed by a computer processor, perform the steps of:
participating by a first device in establishment of a first device pair with a second device;
participating by the first device in establishment of a simultaneous transmissions mode between the first device pair, and a second device pair including a third and fourth devices;
wirelessly receiving by the first device a portion of a first packet from the third device that was transmitted by the third device and destined for the fourth device, the portion of the first packet containing a length value and a wireless transmission rate value for the first packet;
calculating by the first device, a remaining duration for the first packet based on the length and transmission rate values;
generating by the first device, a second packet to be transmitted by the first device and destined for the second device, having a duration that fits within and is less than or equal to the calculated remaining duration of the first packet; and
wirelessly transmitting by the first device, the second packet destined for the second device to fit within the calculated remaining duration of the first packet.

* * * * *